United States Patent
Nam et al.

(10) Patent No.: US 11,792,059 B2
(45) Date of Patent: Oct. 17, 2023

(54) TIME-DOMAIN DMRS PATTERN FOR SINGLE-CARRIER COMMUNICATION WAVEFORM

(71) Applicant: QUALCOMM Incorporated, San Diego, CA (US)

(72) Inventors: Wooseok Nam, San Diego, CA (US); Jing Sun, San Diego, CA (US); Xiaoxia Zhang, San Diego, CA (US); Tao Luo, San Diego, CA (US); Jun Ma, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 251 days.

(21) Appl. No.: 17/464,101

(22) Filed: Sep. 1, 2021

(65) Prior Publication Data

US 2022/0070037 A1    Mar. 3, 2022

Related U.S. Application Data

(60) Provisional application No. 63/073,847, filed on Sep. 2, 2020.

(51) Int. Cl.
*H04L 1/00* (2006.01)
*H04L 27/26* (2006.01)

(52) U.S. Cl.
CPC ........ *H04L 27/2613* (2013.01); *H04L 1/0051* (2013.01); *H04L 27/2607* (2013.01)

(58) Field of Classification Search
CPC ............... H04L 1/0051; H04L 27/2607; H04L 27/2613; H04L 27/26134; H04L 27/2636
See application file for complete search history.

(56) References Cited

U.S. PATENT DOCUMENTS

| | | | |
|---|---|---|---|
| 2019/0021062 A1* | 1/2019 | Abedini | H04L 5/0053 |
| 2019/0342910 A1* | 11/2019 | Cao | H04L 5/0048 |
| 2020/0287679 A1* | 9/2020 | Sun | H04L 5/0048 |
| 2021/0083911 A1* | 3/2021 | Morozov | H04L 27/2014 |

* cited by examiner

*Primary Examiner* — Mohammad S Anwar
*Assistant Examiner* — Natali Pascual Peguero
(74) *Attorney, Agent, or Firm* — Holland & Hart LLP

(57) ABSTRACT

Methods, systems, and devices for wireless communications are described. A wireless device may generate a set of symbols, wherein each symbol of the set of symbols includes a first portion including data and a second portion including a demodulation reference signal (DMRS) sequence, wherein the second portion of each symbol is positioned at the end of the respective symbol. The wireless device may add, to a beginning of each symbol in the set of symbols, a cyclic prefix including the DMRS sequence in the second portion of the respective symbol. The wireless device may then transmit the set of symbols, including the cyclic prefix at the beginning of each respective symbol, in a burst over a wireless channel using a single-carrier waveform.

30 Claims, 17 Drawing Sheets

TIME-DOMAIN DMRS PATTERN FOR SINGLE-CARRIER COMMUNICATION WAVEFORM

CROSS REFERENCE

The present application for patent claims the benefit of U.S. Provisional Patent Application No. 63/073,847 by NAM et al., entitled "TIME-DOMAIN DMRS PATTERN FOR SINGLE-CARRIER COMMUNICATION WAVEFORM," filed Sep. 2, 2020, assigned to the assignee hereof, and expressly incorporated by reference herein.

FIELD OF TECHNOLOGY

The following relates to wireless communications, including time-domain demodulation reference signal (DMRS) patterns for single-carrier communication waveform.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform (DFT) spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, single-carrier waveforms may be desirable for certain types of wireless communications. However, frequency-domain implementations of single-carrier waveforms may suffer from high complexity, and time-domain implementations of single-carrier waveforms may not be compatible with both frequency-domain and time-domain receivers.

SUMMARY

The described techniques relate to improved methods, systems, devices, and apparatuses that support time-domain demodulation reference signal (DMRS) patterns for single-carrier communication waveform. Generally, the described techniques provide for a time-domain DMRS pattern for a single-carrier waveform. In particular, techniques described herein may enable a time-domain DMRS pattern for single-carrier waveforms which may be applicable for both time-domain and frequency-domain equalization procedures. In some aspects, a transmitting wireless device (e.g., user equipment (UE), base station) may generate a set of symbols, where each symbol includes data and a DMRS sequence at the end of each respective symbol. The transmitting wireless device may additionally add, to a beginning of each symbol, a cyclic prefix including a repetition of the DMRS sequence which is present at the end of the respective symbol. The set of symbols may then be transmitted as a burst of sequential symbols via a single-carrier waveform. In some cases, the transmitting wireless device may add additional DMRS sequences between the cyclic prefix and the DMRS sequences within the respective symbols to increase redundancy within the burst. For example, the transmitting device may add an additional DMRS sequence immediately following the cyclic prefix of the sequentially first symbol of each burst and/or sub-burst, and may similarly add an additional DMRS sequence immediately before the DMRS sequence at the end of the sequentially last symbol of the burst or sub-burst. The increased redundancy across the burst and/or sub-bursts within the burst may facilitate both frequency-domain and time-domain equalization procedures. In some implementations, the DMRS sequences may include sub-sequences of longer DMRS sequences. In such cases, the sub-sequences of the longer DMRS sequence may be cyclically shifted for sequential symbols within the burst, thereby improving interference randomization. By enabling for a time-domain DMRS signal for single-carrier waveforms, the efficiency and reliability of wireless communications may be improved.

A method of wireless communication at a wireless device is described. The method may include generating a set of symbols, where each symbol of the set of symbols includes a first portion including data and a second portion including a DMRS sequence, where the second portion of each symbol is positioned at the end of the respective symbol, adding, to a beginning of each symbol in the set of symbols, a cyclic prefix including the DMRS sequence in the second portion of the respective symbol, and transmitting the set of symbols, including the cyclic prefix at the beginning of each respective symbol, in a burst over a wireless channel using a single carrier waveform.

An apparatus for wireless communication at a wireless device is described. The apparatus may include a processor, memory coupled with the processor, and instructions stored in the memory. The instructions may be executable by the processor to cause the apparatus to generate a set of symbols, where each symbol of the set of symbols includes a first portion including data and a second portion including a DMRS sequence, where the second portion of each symbol is positioned at the end of the respective symbol, add, to a beginning of each symbol in the set of symbols, a cyclic prefix including a repetition of the DMRS sequence in the second portion of the respective symbol, and transmit the set of symbols, including the cyclic prefix at the beginning of each respective symbol, in a burst over a wireless channel using a single carrier waveform.

Another apparatus for wireless communication at a wireless device is described. The apparatus may include means for generating a set of symbols, where each symbol of the set of symbols includes a first portion including data and a second portion including a DMRS sequence, where the second portion of each symbol is positioned at the end of the respective symbol, adding, to a beginning of each symbol in the set of symbols, a cyclic prefix including a repetition of the DMRS sequence in the second portion of the respective symbol, and transmitting the set of symbols, including the cyclic prefix at the beginning of each respective symbol, in a burst over a wireless channel using a single carrier waveform.

A non-transitory computer-readable medium storing code for wireless communication at a wireless device is described. The code may include instructions executable by a processor to generate a set of symbols, where each symbol of the set of symbols includes a first portion including data and a second portion including a DMRS sequence, where the second portion of each symbol is positioned at the end of the respective symbol, add, to a beginning of each symbol in the set of symbols, a cyclic prefix including a repetition of the DMRS sequence in the second portion of the respective symbol, and transmit the set of symbols, including the cyclic prefix at the beginning of each respective symbol, in a burst over a wireless channel using a single carrier waveform.

Some examples of the method, apparatuses, and non-transitory computer-readable medium described herein may further include operations, features, means, or instructions for adding, for at least one symbol of the set of symbols, at least one additional DMRS sequence between the cyclic prefix and the second portion of the at least one symbol.

In some examples of the method, apparatuses, and non-transitory computer-readable medium described herein, adding the at least one additional DMRS sequence may include operations, features, means, or instructions for adding the at least one additional DMRS sequence immediately following the cyclic prefix of the at least one symbol.

In some examples of the method, apparatuses, and non-transitory computer-readable medium described herein, adding the at least one additional DMRS sequence may include operations, features, means, or instructions for adding the at least one additional DMRS sequence immediately preceding the second portion including the DMRS sequence of the at least one symbol.

In some examples of the method, apparatuses, and non-transitory computer-readable medium described herein, the at least one symbol includes a sequentially first symbol of the burst, a sequentially last symbol of the burst, or both.

In some examples of the method, apparatuses, and non-transitory computer-readable medium described herein, the burst includes a set of sub-bursts, where the at least one symbol includes a sequentially first symbol in each sub-burst, a sequentially last symbol in each sub-burst, or both.

In some examples of the method, apparatuses, and non-transitory computer-readable medium described herein, the set of sub-bursts include a first sub-burst including a first set of symbols and a second sub-burst including a second set of symbols, where each DMRS sequence within each of the first set of symbols include a first format, and where each DMRS sequence within each of the second set of symbols include a second format different from the first format.

In some examples of the method, apparatuses, and non-transitory computer-readable medium described herein, the at least one symbol of the set of symbols further includes a sequentially last symbol in each sub-burst of the set of sub-bursts.

In some examples of the method, apparatuses, and non-transitory computer-readable medium described herein, the at least one symbol includes each symbol of the set of symbols.

In some examples of the method, apparatuses, and non-transitory computer-readable medium described herein, the at least one additional DMRS sequence in each symbol of the set of symbols includes a second format different from a first format of the cyclic prefix and the DMRS sequence of the second portion of the respective symbol.

In some examples of the method, apparatuses, and non-transitory computer-readable medium described herein, the DMRS sequence in the second portion of each symbol and the at least one additional DMRS sequence include sub-sequences of a longer DMRS sequence.

In some examples of the method, apparatuses, and non-transitory computer-readable medium described herein, the sub-sequences of the longer DMRS sequence may be shifted according to a cyclical shift pattern for each sequential symbol of the set of symbols.

In some examples of the method, apparatuses, and non-transitory computer-readable medium described herein, a first symbol includes a first iteration of the longer DMRS sequence and a second symbol immediately following the first symbol includes a second iteration of the longer DMRS sequence different from the first iteration, where a $(k+1)^{th}$ sub-sequence of the first iteration of the longer DMRS sequence includes a $k^{th}$ sub-sequence of the second iteration of the longer DMRS sequence.

In some examples of the method, apparatuses, and non-transitory computer-readable medium described herein, each sub-sequence of the longer DMRS sequence include an identical time duration.

In some examples of the method, apparatuses, and non-transitory computer-readable medium described herein, a length of the DMRS sequence, the at least one additional DMRS sequence, or both, may be based on a frequency selectivity of the wireless channel.

In some examples of the method, apparatuses, and non-transitory computer-readable medium described herein, a length of the cyclic prefix may be based on a delay spread of the wireless channel, a timing error requirement associated with the wireless channel, or both.

In some examples of the method, apparatuses, and non-transitory computer-readable medium described herein, each DMRS sequence within the burst may be identical.

In some examples of the method, apparatuses, and non-transitory computer-readable medium described herein, transmitting the set of symbols may include operations, features, means, or instructions for transmitting a first symbol and a second symbol immediately following the first symbol, where the second portion including the DMRS sequence of the first symbol immediately precedes the cyclic prefix of the second symbol.

In some examples of the method, apparatuses, and non-transitory computer-readable medium described herein, a discrete Fourier transform (DFT) of the DMRS sequence of each symbol of the set of symbols includes a constant modulus sequence.

In some examples of the method, apparatuses, and non-transitory computer-readable medium described herein, the DMRS sequence of each symbol of the set of symbols includes a Zadoff-Chu (ZC) sequence, a Constant Amplitude Zero Auto-Correlation (CAZAC) sequence, or both.

A method of wireless communication at a wireless device is described. The method may include receiving, over a wireless channel via a single carrier waveform, a burst including a set of symbols, where each symbol of the set of symbols includes a first portion including data and a second portion including a DMRS sequence, where the second portion of each symbol is positioned at the end of the respective symbol, determining, at a beginning of each symbol in the set of symbols, a cyclic prefix including the DMRS sequence in the second portion of the respective symbol, and performing a channel estimation of the wireless channel based on the DMRS sequence.

An apparatus for wireless communication at a wireless device is described. The apparatus may include a processor, memory coupled with the processor, and instructions stored in the memory. The instructions may be executable by the processor to cause the apparatus to receive, over a wireless channel via a single carrier waveform, a burst including a set of symbols, where each symbol of the set of symbols includes a first portion including data and a second portion including a DMRS sequence, where the second portion of each symbol is positioned at the end of the respective symbol, determine, at a beginning of each symbol in the set of symbols, a cyclic prefix including the DMRS sequence in the second portion of the respective symbol, and perform a channel estimation of the wireless channel based on the DMRS sequence.

Another apparatus for wireless communication at a wireless device is described. The apparatus may include means for receiving, over a wireless channel via a single carrier waveform, a burst including a set of symbols, where each symbol of the set of symbols includes a first portion including data and a second portion including a DMRS sequence, where the second portion of each symbol is positioned at the end of the respective symbol, determining, at a beginning of each symbol in the set of symbols, a cyclic prefix including the DMRS sequence in the second portion of the respective symbol, and performing a channel estimation of the wireless channel based on the DMRS sequence.

A non-transitory computer-readable medium storing code for wireless communication at a wireless device is described. The code may include instructions executable by a processor to receive, over a wireless channel via a single carrier waveform, a burst including a set of symbols, where each symbol of the set of symbols includes a first portion including data and a second portion including a DMRS sequence, where the second portion of each symbol is positioned at the end of the respective symbol, determine, at a beginning of each symbol in the set of symbols, a cyclic prefix including a repetition of the DMRS sequence in the second portion of the respective symbol, and perform a channel estimation of the wireless channel based on the DMRS sequence.

Some examples of the method, apparatuses, and non-transitory computer-readable medium described herein may further include operations, features, means, or instructions for performing a DFT of the DMRS sequence of each symbol of the set of symbols, where performing the channel estimation may be based on performing the DFT.

Some examples of the method, apparatuses, and non-transitory computer-readable medium described herein may further include operations, features, means, or instructions for determining, for at least one symbol of the set of symbols, at least one additional DMRS sequence between the cyclic prefix and the second portion of the at least one symbol, and performing a DFT of the at least one additional DMRS sequence, where performing the channel estimation may be based on performing the DFT.

Some examples of the method, apparatuses, and non-transitory computer-readable medium described herein may further include operations, features, means, or instructions for determining, for at least one symbol of the set of symbols, at least one additional DMRS sequence between the cyclic prefix and the second portion of the at least one symbol, and determining a phase shift between the at least one additional DMRS sequence of the at least one symbol and the DMRS sequence within the second portion of the at least one symbol, where performing the channel estimation may be based on determining the phase shift.

Some examples of the method, apparatuses, and non-transitory computer-readable medium described herein may further include operations, features, means, or instructions for performing a set of time-domain equalizer taps based on the DMRS sequence of each symbol of the set of symbols, where performing the channel estimation may be based on performing the set of time-domain equalizer taps.

Some examples of the method, apparatuses, and non-transitory computer-readable medium described herein may further include operations, features, means, or instructions for determining, for at least one symbol of the set of symbols, at least one additional DMRS sequence between the cyclic prefix and the second portion of the at least one symbol.

In some examples of the method, apparatuses, and non-transitory computer-readable medium described herein, determining the at least one additional DMRS sequence may include operations, features, means, or instructions for determining the at least one additional DMRS sequence immediately following the cyclic prefix of the at least one symbol.

In some examples of the method, apparatuses, and non-transitory computer-readable medium described herein, determining the at least one additional DMRS sequence may include operations, features, means, or instructions for determining the at least one additional DMRS sequence immediately preceding the second portion including the DMRS sequence of the at least one symbol.

In some examples of the method, apparatuses, and non-transitory computer-readable medium described herein, the at least one symbol includes a sequentially first symbol of the burst, a sequentially last symbol of the burst, or both.

In some examples of the method, apparatuses, and non-transitory computer-readable medium described herein, the burst includes a set of sub-bursts, where the at least one symbol includes a sequentially first symbol in each sub-burst, a sequentially last symbol in each sub-burst, or both.

In some examples of the method, apparatuses, and non-transitory computer-readable medium described herein, the set of sub-bursts include a first sub-burst including a first set of symbols and a second sub-burst including a second set of symbols, where each DMRS sequence within each of the first set of symbols include a first format, and where each DMRS sequence within each of the second set of symbols include a second format different from the first format.

In some examples of the method, apparatuses, and non-transitory computer-readable medium described herein, the at least one symbol includes each symbol of the set of symbols.

In some examples of the method, apparatuses, and non-transitory computer-readable medium described herein, the at least one additional DMRS sequence in each symbol of the set of symbols includes a second format different from a first format of the cyclic prefix and the DMRS sequence of the second portion of the respective symbol.

In some examples of the method, apparatuses, and non-transitory computer-readable medium described herein, the DMRS sequence in the second portion of each symbol and the at least one additional DMRS sequence include sub-sequences of a longer DMRS sequence.

In some examples of the method, apparatuses, and non-transitory computer-readable medium described herein, the sub-sequences of the longer DMRS sequence may be shifted according to a cyclical shift pattern for each sequential symbol of the set of symbols.

In some examples of the method, apparatuses, and non-transitory computer-readable medium described herein, a first symbol includes a first iteration of the longer DMRS sequence and a second symbol immediately following the first symbol includes a second iteration of the longer DMRS sequence different from the first iteration, where a $(k+1)^{th}$ sub-sequence of the first iteration of the longer DMRS sequence includes a $k^{th}$ sub-sequence of the second iteration of the longer DMRS sequence.

In some examples of the method, apparatuses, and non-transitory computer-readable medium described herein, each sub-sequence of the longer DMRS sequence include an identical time duration.

In some examples of the method, apparatuses, and non-transitory computer-readable medium described herein, a length of the DMRS sequence, the at least one additional DMRS sequence, or both, may be based on a frequency selectivity of the wireless channel.

In some examples of the method, apparatuses, and non-transitory computer-readable medium described herein, a length of the cyclic prefix may be based on a delay spread of the wireless channel, a timing error requirement associated with the wireless channel, or both.

In some examples of the method, apparatuses, and non-transitory computer-readable medium described herein, each DMRS sequence within the burst may be identical.

In some examples of the method, apparatuses, and non-transitory computer-readable medium described herein, receiving the burst including the set of symbols may include operations, features, means, or instructions for receiving a first symbol and a second symbol immediately following the first symbol, where the second portion including the DMRS sequence of the first symbol immediately precedes the cyclic prefix of the second symbol.

In some examples of the method, apparatuses, and non-transitory computer-readable medium described herein, a DFT of the DMRS sequence of each symbol of the set of symbols includes a constant modulus sequence.

In some examples of the method, apparatuses, and non-transitory computer-readable medium described herein, the DMRS sequence of each symbol of the set of symbols includes a ZC sequence, a CAZAC sequence, or both.

DETAILED DESCRIPTION

Figure 1:
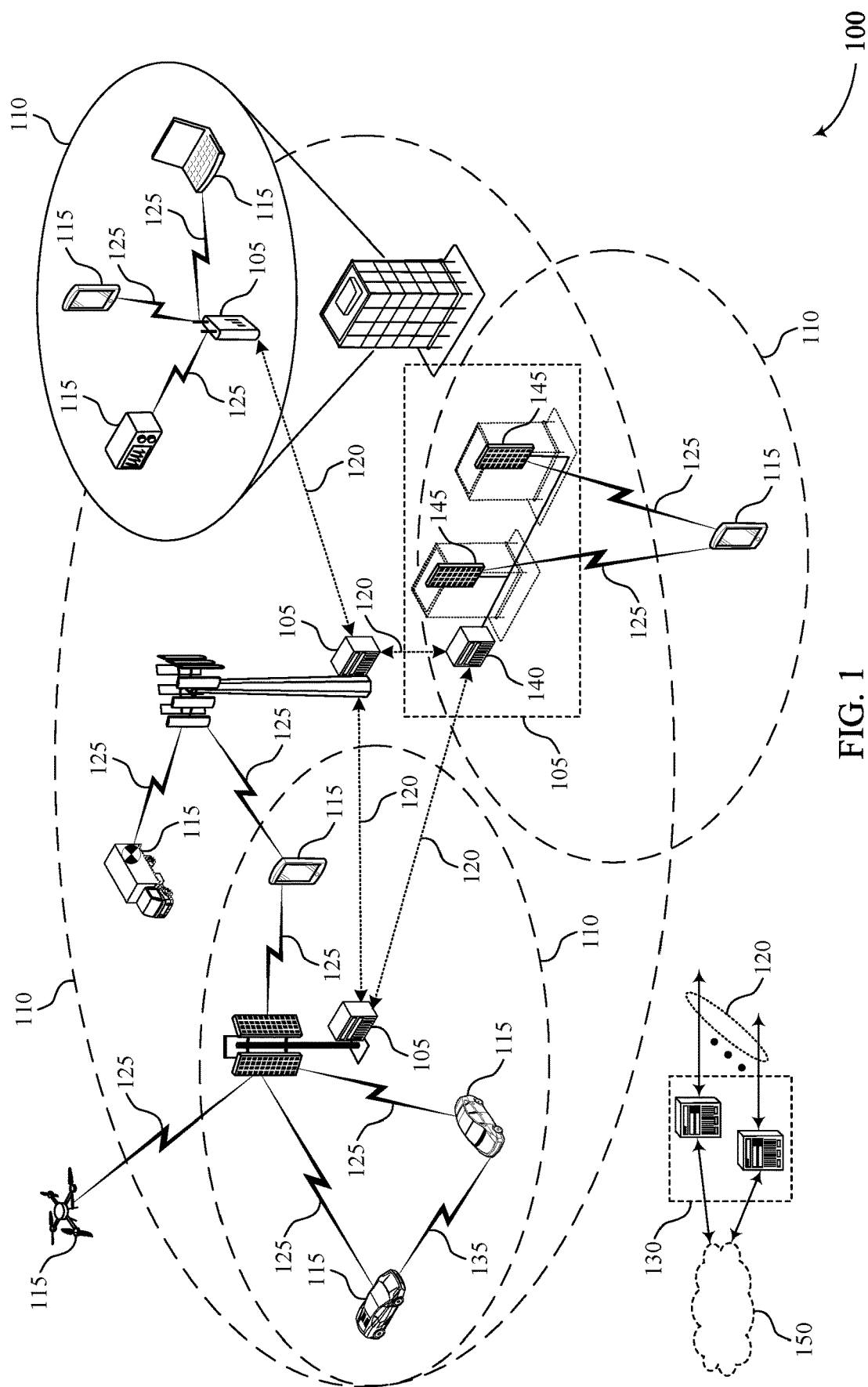
FIG. 1 illustrates an example of a wireless communications system that supports time-domain demodulation reference signal (DMRS) patterns for single-carrier communication waveform in accordance with aspects of the present disclosure.

In some wireless communications systems, higher frequency bands (e.g., frequency bands over 60 GHz) may be associated with decreased power amplifier efficiency and increased radio frequency impairments (e.g., phase noise, IQ imbalance). Single-carrier waveforms may be robust to these impairments due to their low peak-to-average power ratios (PAPR), making the single-carrier waveforms desirable for wireless communications in the higher frequency bands. In frequency-domain implementations, a single-carrier waveform (e.g., discrete Fourier transform (DFT) spread orthogonal frequency division multiplexing (OFDM) (DFT-s-OFDM) waveform) may be generated via frequency-domain precoding on the transmitter side, and frequency-domain equalization procedures may be used on the receiver side. While frequency-domain implementation may improve bandwidth utilization, they may suffer from high complexity. Comparatively, in time-domain implementations, a single-carrier waveform (e.g., single-carrier quadrature amplitude modulation (SC-QAM) waveform) may be generated via time-domain filtering (e.g., pulse shaping filters) on a transmitter side, and matched filtering and time-domain equalization may be performed on the receiver side. Time-domain implementations may benefit from reduced complexity as compared to frequency-domain implementations, making time-domain implementations more suitable for higher frequency bands. However, some structures of references signals (e.g., demodulation reference signals (DMRS)) used for decoding single-carrier waveforms in the current wireless communication standards (e.g., wireless communications standards for Long-Term Evolution (LTE) communications and/or New Radio (NR)) are not suitable for time-domain equalization. Accordingly, there is currently no single-domain DMRS pattern for single-carrier waveforms which may be used for both frequency-domain and time-domain equalization.

To improve wireless communications, techniques for a time-domain DMRS pattern for single-carrier waveforms are disclosed. In particular, techniques described herein may enable a time-domain DMRS pattern for single-carrier waveforms which may be applicable for both time-domain and frequency-domain equalization procedures. In some aspects, a transmitting wireless device may generate a set of symbols, where each symbol includes data and a DMRS sequence at the end of each respective symbol. The transmitting wireless device may additionally add, to a beginning of each symbol, a cyclic prefix including a repetition of the DMRS sequence at the end of the respective symbol. The set of symbols may then be transmitted as a burst of sequential symbols via a single-carrier waveform.

In some cases, the transmitting wireless device may add additional DMRS sequences between the cyclic prefix and the DMRS sequences within the respective symbols at least in part to increase redundancy within the burst, to maintain cyclic structure of DMRS sequence, or both. For example, the transmitting wireless device may add an additional DMRS sequence immediately following the cyclic prefix of the sequentially first symbol of each burst and/or sub-burst. Additionally or alternatively, the transmitting wireless device may similarly add an additional DMRS sequence immediately before the DMRS sequence at the end of the sequentially last symbol of the burst or sub-burst. The increased redundancy across the burst and/or sub-bursts within the burst may facilitate both frequency-domain and time-domain equalization procedures. In some implementations, the DMRS sequences may include sub-sequences of longer DMRS sequences. In such cases, the sub-sequences of the longer DMRS sequence may be cyclically shifted for sequential symbols within the burst, thereby improving interference randomization. By enabling for a time-domain DMRS signal for single-carrier waveforms, the efficiency and reliability of wireless communications may be improved.

Aspects of the disclosure are initially described in the context of wireless communications systems. Aspects of the disclosure are additionally described in the context of example resource allocation schemes and an example process flow. Aspects of the disclosure are further illustrated by and described with reference to apparatus diagrams, system diagrams, and flowcharts that relate to time-domain DMRS pattern for single-carrier communication waveform.

FIG. 1 illustrates an example of a wireless communications system 100 that supports time-domain DMRS pattern for single-carrier communication waveform in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or DFT spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported DFT size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

As noted preciously herein, power amplifier efficiency may decrease, and radio frequency impairments (e.g., phase noise, IQ imbalance) may become more severe at higher frequency bands, such as frequency bands over 60 GHz. In some cases, single-carrier waveforms may be robust to these impairments due to their low PAPRs, making the single-carrier waveforms desirable for wireless communications in the higher frequency bands. In some frequency-domain implementations, a single-carrier waveform (e.g., DFT-s-OFDM waveform) may be generated via frequency-domain precoding on the transmitter side, and frequency-domain equalization procedures may be used on the receiver side. While frequency-domain waveforms may improve bandwidth utilization, they may suffer from high complexity. Moreover, frequency-domain modulated DMRS signals may not be suitable for time-domain receivers.

Comparatively, in some time-domain implementations, a single-carrier waveform (e.g., SC-QAM waveform) may be generated via time-domain filtering (e.g., pulse shaping filters) on a transmitter side, and matched filtering and time-domain equalization may be performed on the receiver side. Time-domain implementations may benefit from reduced complexity as compared to frequency-domain implementations, making time-domain implementations more suitable for higher frequency bands. However, structures of some DMRS references signals used for decoding single-carrier waveforms are not suitable for both time-domain and frequency domain equalization. This may result in issues in the context of frequency-domain receivers, such as receivers at a base station 105 which utilize frequency-domain estimation and equalization for improved performance in severe channel fading environments (e.g., outdoor environments).

Accordingly, to improve wireless communications, the UEs 115 and the base stations 105 of the wireless communications system 100 may support techniques for time-domain DMRS patterns for single-carrier waveforms. For example, a transmitting wireless device (e.g., UE 115, base station 105) may generate a set of symbols, where each symbol includes data and a DMRS sequence at the end of each respective symbol. The transmitting wireless device may additionally add, to a beginning of each symbol, a cyclic prefix including a repetition of the DMRS sequence at the end of the respective symbol. The set of symbols may then be transmitted as a burst of sequential symbols via a single-carrier waveform, which may be received and decoded by a receiving wireless device (e.g., UE 115, base station 105). In particular, receiving wireless device may be configured to decode the set of symbols via frequency-domain equalization procedures, time-domain equalization procedures, or both.

In some cases, the transmitting wireless device may add additional DMRS sequences between the cyclic prefix and the DMRS sequences within the respective symbols to increase redundancy within the burst. For example, the transmitting device may add an additional DMRS sequence immediately following the cyclic prefix of the sequentially first symbol of each burst and/or sub-burst, and may similarly add an additional DMRS sequence immediately before the DMRS sequence at the end of the sequentially last symbol of the burst or sub-burst. The increased redundancy across the burst and/or sub-bursts within the burst may facilitate both the frequency-domain and time-domain equalization procedures. In some implementations, the DMRS sequences may include sub-sequences of longer DMRS sequences. In such cases, the sub-sequences of the longer DMRS sequence may be cyclically shifted for sequential symbols within the burst, thereby improving interference randomization.

The techniques described herein may provide for improved single-carrier communications, which may enable more efficient and reliable wireless communications, particularly at higher frequency bands. In particular, techniques described herein may support a time-domain DMRS pattern for single-carrier waveforms which exhibit improved DMRS redundancy, thereby enabling the single-carrier waveforms to be received and decoded by both frequency-domain receivers and time-domain receivers, thereby improving wireless communications within the wireless communications system 100.

Figure 2:
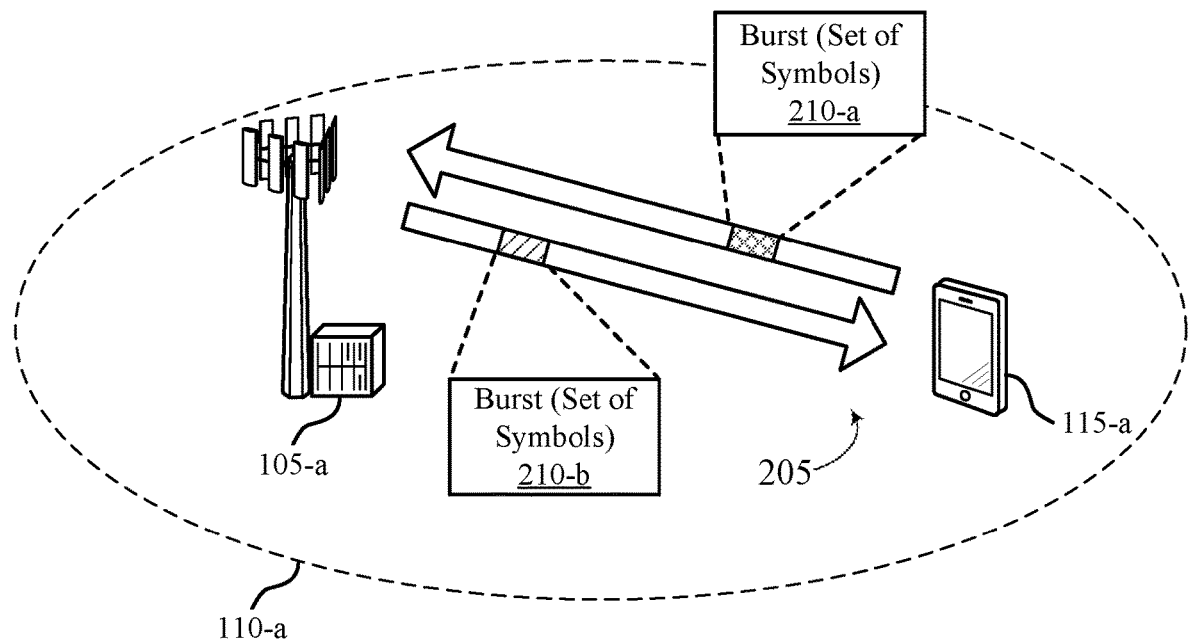
FIG. 2 illustrates an example of a wireless communications system that supports time-domain DMRS patterns for single-carrier communication waveform in accordance with aspects of the present disclosure.

FIG. 2 illustrates an example of a wireless communications system 200 that supports time-domain DMRS pattern for single-carrier communication waveform in accordance with aspects of the present disclosure. In some examples, wireless communications system 200 may implement aspects of wireless communications system 100. The wireless communications system 200 may include a UE 115-*a* and a base station 105-*a*, which may be examples of UEs 115 and base stations 105, as described with reference to FIG. 1.

The base station 105-*a* may support wireless communications with wireless devices (e.g., UE 115-*a*) within a geographic coverage area 110-*a*. The UE 115-*a* may communicate with the base station 105-*a* using a communication link 205. In some cases, the communication link 205 may include an example of an access link (e.g., a Uu link). The communication link 205 may include a bi-directional link that can include both uplink and downlink communication. For example, the UE 115-*a* may transmit uplink transmissions, such as uplink control signals or uplink data signals, to the base station 105-*a* using the communication link 205, and the base station 105-*a* may transmit downlink transmissions, such as downlink control signals or downlink data signals, to the UE 115-*a* using the communication link 205.

The UE 115-*a* and the base stations 105-*a* of the wireless communications system 200 may support techniques for time-domain DMRS patterns for single-carrier waveforms. In some aspects, the UE 115-*a*, the base station 105-*a*, or both, may be considered as transmitting wireless devices and/or receiving wireless devices, depending on the direction of the respective communications. In this regard, both the UE 115-*a* and the base station 105-*a* of the wireless communications system 200 may generally be referred to as transmitting wireless devices and receiving wireless devices.

For example, a transmitting wireless device (e.g., UE 115-*a*, base station 105-*a*, or both) of the wireless communications system 200 may generate a set of symbols which are to be transmitted to a receiving wireless device (e.g., UE 115-*a*, base station 105-*a*, or both). For example, UE 115-*a* may generate any quantity of symbols which are to be transmitted in a burst 210-*a* over a wireless channel (e.g., communication link 205) using a single-carrier waveform. In some aspects, each symbol may include a first portion including data and a second portion including a DMRS sequence. The second portion (e.g., DMRS sequence) may be positioned at the end of each respective symbol. The DMRS sequence of each symbol may include, but is not limited to, a Zadoff-Chu (ZC) sequence, a Constant Amplitude Zero Auto-Correlation (CAZAC) sequence, or both.

In some cases, the each DMRS sequence within each of the symbols of the burst 210-*a* and 210-*b* may be identical. Additionally or alternatively, a burst may include one or more sub-bursts, where the DMRS sequences within each sub-burst are identical. For example, a burst 210 may include a first sub-burst including a first set of one or more symbols, and a second sub-burst including a second set of one or more symbols. In this example, the respective transmitting device may generate the symbols such that the first set of one or more symbols include a first format of DMRS sequences, and the second set of one or more symbols include a second format of DMRS sequences different from the first format.

In some aspects, the transmitting wireless device (e.g., UE 115-*a*, base station 105-*a*, or both) may add a cyclic prefix including a repetition of the DMRS sequence in the second portion of each respective symbol to the beginning of each of the respective symbols. In this regard, each of the symbols may include a DMRS sequence at the end of the symbol, and an additional repetition of the DMRS sequence within a cyclic prefix at the beginning of the respective symbol. For example, the transmitting wireless device may add a first cyclic prefix to the beginning of a first symbol, where the first cyclic prefix includes the DMRS sequence at the end of the first symbol (e.g., the DMRS sequence within the second portion of the first symbol). Similarly, by way of another example, the transmitting wireless device may add a second cyclic prefix to the beginning of a second symbol, where the second cyclic prefix includes the DMRS sequence at the end of the second symbol. In some aspects, the transmitting wireless device may add the cyclic prefixes to each symbol based on generating the set of symbols which are to be transmitted within the burst 210-*a* and 210-*b*.

In some aspects, the transmitting wireless device (e.g., UE 115-*a*, base station 105-*a*, or both) may add an additional DMRS sequence for at least one symbol of the set of symbols. In some aspects, the additional DMRS sequence(s) may include at least a portion of the DMRS sequence of the second portion of the respective symbol. In some aspects, the additional DMRS sequences may be added between the cyclic prefix and the DMRS sequence of the at least one symbol. In some cases, the transmitting wireless device may add an additional DMRS sequence to the sequentially first symbol of the burst, to the sequentially last symbol of the burst, or both. For example, the transmitting wireless device may add an additional DMRS sequence immediately following the cyclic prefix at the beginning of the first symbol within the burst 210, and an additional DMRS sequence immediately preceding the DMRS sequence at the end of the last symbol within the burst 210. In additional or alternative cases, the transmitting wireless device may add an additional DMRS sequence to the sequentially first symbol of each sub-burst within the burst 210, to the sequentially last symbol of each sub-burst within the burst 210, or both. In additional or alternative cases, the transmitting wireless device may add an additional DMRS sequence to every symbol within the burst 210. In some aspects, the transmitting wireless device may add the one or more additional DMRS sequences to the at least one symbol within the burst 210 based on generating the set of symbols within the burst 210, adding the cyclic prefixes to each of the symbols within the burst 210, or both.

In some aspects, the transmitting wireless device (e.g., UE 115-*a*, base station 105-*a*, or both) may transmit each of the symbols (including the cyclic prefixes at the beginning of each respective symbol and/or the additional DMRS sequences) in the burst 210 to the receiving wireless device (e.g., UE 115-*a*, base station 105-*a*, or both). In some aspects, the transmitting wireless device may transmit the symbols in the burst 210 over a wireless channel (e.g., communication link 205) using a single-carrier waveform. The transmitting wireless device may transmit the symbols within the burst 210 at based on generating the set of symbols within the burst 210, adding the cyclic prefixes to each symbol within the burst 210, adding the one or more additional DMRS sequences to at least one symbol within the burst 210, or any combination thereof.

In some aspects, the transmitting wireless device may transmit the symbols within the burst 210 sequentially such that sequential symbols are positioned adjacent to one another in the time domain. For example, the transmitting wireless device may transmit the second symbol of the burst 210 immediately following the first symbol of the burst 210 such that the second portion of the first symbol (e.g., the DMRS sequence of the first symbol) immediately precedes the cyclic prefix of the second symbol. Similarly, the transmitting wireless device may transmit the third symbol immediately following the second symbol such that the second portion of the second symbol (e.g., the DMRS sequence of the second symbol) immediately precedes the cyclic prefix of the third symbol.

Upon receiving the respective burst 210-*a* and 210-*b*, the receiving wireless device (e.g., UE 115-*a*, base station 105-*a*, or both) may determine the cyclic prefixes within each symbol of the respective burst 210. By adding a cyclic prefix to the head of each symbol, the DMRS sequences may be duplicated, thereby increasing a redundancy of the DMRS sequences within the burst. This improved DMRS redundancy resulting from duplicated DMRS sequences may facilitate reception and decoding by both frequency-domain receivers as well as time-domain receivers.

In some aspects, the receiving wireless device may determine the additional DMRS sequences within the at least one symbol of the burst 210. For example, in cases where the UE 115-*a* adds an additional DMRS sequence to the sequentially first symbol of the burst 210-*a* and the sequentially last symbol of the bust 210-*a*, the base station 105-*a* may determine (e.g., identify) the additional DMRS sequences within the sequentially first and sequentially last symbols of the burst 210-*a*.

In some aspects, the receiving wireless device (e.g., UE 115-*a*, base station 105-*a*, or both) may perform channel estimation on the received symbols (e.g., channel estimation on the received burst 210). In some aspects, the receiving wireless device may perform channel estimation based on receiving the symbols within the burst 210, determining the cyclic prefixes within each symbol of the burst 210, determining the additional DMRS sequences within one or more symbols of the burst 210, or any combination thereof.

In some aspects, the receiving wireless device may perform channel estimation differently dependent on whether the respective receiving wireless device serves as a frequency-domain receiver or a time-domain receiver. For example, in the context of a frequency-domain receiving wireless device, the base station 105-*a* perform channel estimation of the burst 210-*a* based on the DMRS sequences within the respective symbols of the burst 210-*a* by performing a DFT of each of the symbols. For example, the base station 105-*a* may perform a DFT of each symbol (e.g., each DMRS sequence and/or additional DMRS sequences of each symbol) within the burst 210-*a*. For instance, upon receiving the first symbol of the burst 210-*a*, the base station 105-*a* may be configured to discard, or otherwise ignore, the cyclic prefix of the first symbol and perform channel estimation by performing a DFT across/within a Fourier transform window associated with the first symbol. In this example, Fourier transform window associated with the first symbol may include the DMRS sequence and/or an additional DMRS sequence. The base station 105-*a* may be configured to similarly perform DFTs within/across each symbol within the burst 210-*a*. After performing the channel estimation, the respective receiving wireless devices may perform frequency-domain equalization for each symbol based on (e.g., using) the estimation of the channel.

Conversely, in the context of a time-domain receiver, the receiving wireless devices may receive the burst 210-*a* and 210-*b* from the respective transmitting wireless device and may perform channel estimation/equalization of the burst 210 by determining a phase shift between DMRS sequences, cyclic prefixes, additional DMRS sequences, or any combination thereof, within the respective symbols. For example, the base station 105-*a* may perform channel estimation/equalization by determining a phase shift between the additional DMRS sequence following the cyclic prefix at the beginning of the first symbol and the DMRS sequence at the end of the first symbol. By way of another example, the base station 105-*a* may estimate the channel by performing a set of time-domain equalizer taps based on (e.g., using) the DMRS sequences, the cyclic prefixes, and/or the additional DMRS sequences within the respective symbols.

The techniques described herein may provide for improved single-carrier communications, which may enable more efficient and reliable wireless communications, particularly at higher frequency bands. In particular, techniques described herein may support a time-domain DMRS pattern for single-carrier waveforms which exhibit improved DMRS redundancy, thereby enabling the single-carrier waveforms to be received and decoded by both frequency-domain receivers and time-domain receivers, thereby improving wireless communications within the wireless communications system 200.

Figure 3:
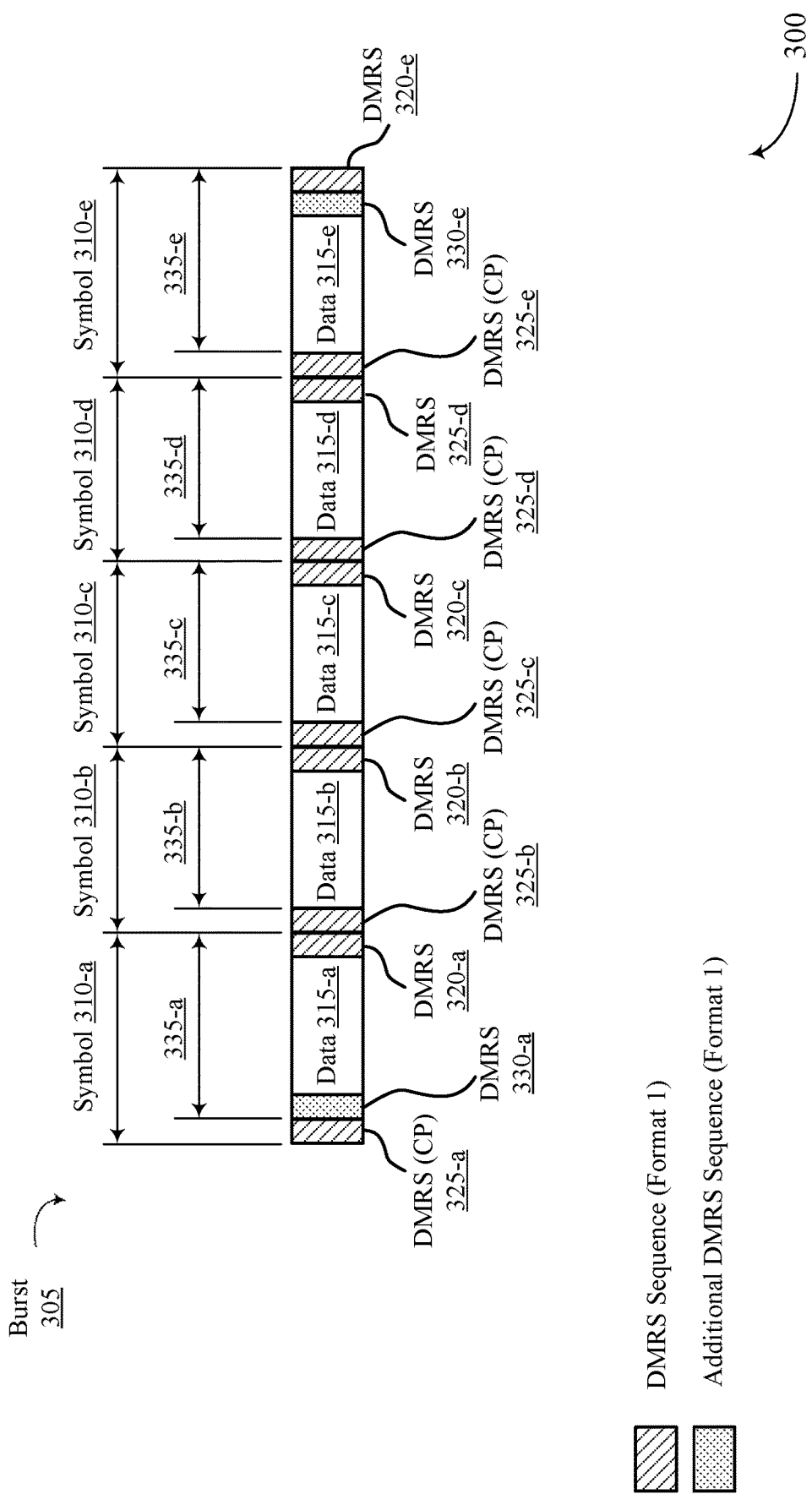
FIG. 3 illustrates an example of a resource allocation scheme that supports time-domain DMRS patterns for single-carrier communication waveform in accordance with aspects of the present disclosure.

FIG. 3 illustrates an example of a resource allocation scheme 300 that supports time-domain DMRS pattern for single-carrier communication waveform in accordance with aspects of the present disclosure. In some examples, resource allocation scheme 300 may implement, or be implemented by, aspects of wireless communications system 100, wireless communications system 200, or both.

In some aspects, the resource allocation scheme 300 may illustrate an example burst 305 of symbols 310 which may be transmitted over a wireless channel using a single-carrier waveform, as described previously herein with respect to FIGS. 1-2. For example, in some aspects, a transmitting wireless device (e.g., UE 115, base station 105, or both) may generate a set of symbols 310. For instance, as shown in FIG. 3, the transmitting device may generate a first symbol 310-*a*, a second symbol 310-*b*, a third symbol 310-*c*, a fourth symbol 310-*d*, and a fifth symbol 310-*e*. The transmitting wireless device may generate any quantity of symbols which are to be transmitted via the burst 305.

In some aspects, each symbol may include a first portion including data portion (e.g., data 315) and a second portion including a DMRS sequence 320. The second portion (e.g., DMRS sequence 320) may be positioned at the end of each respective symbol 310. For example, the first symbol 310-*a* may include a first portion including data 315-*a* and a second portion including a DMRS sequence 320-*a* positioned at the end of the first symbol 310-*a*. Similarly, the second symbol 310-*b* may include a first portion including data 315-*b* and a second portion including a DMRS sequence 320-*b* positioned at the end of the second symbol 310-*b*.

The DMRS sequence 320 of each symbol 310 may include, but is not limited to, a ZC sequence, a CAZAC sequence, or both. In some cases, the each DMRS sequence 320 within each of the symbols 310 of the burst 305 may be identical. For example, in some cases, the DMRS sequences 320-*a*, 320-*b*, 320-*c*, 320-*d*, and 320-*e* may include a common format (e.g., Format 1). In this regard, each of the DMRS sequences 320-*a* through 320-*e* may be identical.

In some aspects, the transmitting wireless device may add a cyclic prefix 325 including the DMRS sequence in the second portion of each respective symbol 310 to the beginning of each of the respective symbols. In this regard, each of the symbols 310 may include a DMRS sequence 320 at the end of the symbol, and an additional repetition of the DMRS sequence 320 within a cyclic prefix 325 at the beginning of the respective symbol 310. For example, the transmitting wireless device may add a cyclic prefix 325-*a* to the beginning of the first symbol 310-*a*, where the cyclic prefix 325-*a* includes the DMRS sequence 320-*a* at the end of the first symbol 310-*a* (e.g., the DMRS sequence 320-*a* within the second portion of the first symbol 310-*a*). Similarly, by way of another example, the transmitting wireless device may add a cyclic prefix 325-*b* to the beginning of the second symbol 310-*b*, where the cyclic prefix 325-*b* includes the DMRS sequence 320-*b* at the end of the second symbol 310-*b*. In cases where each of the DMRS sequences 320-*a* through 320-*e* are identical, each of the cyclic prefixes 325-*a* through 325-*e* may also be identical to the other cyclic prefixes 325 as well as the DMRS sequences 320.

Additionally or alternatively, the transmitting wireless device may add an additional DMRS sequence 330 for at least one symbol 310 of the set of symbols 310. In some aspects, the additional DMRS sequence 330 within the at least one symbol 310 may include a repetition of at least a portion of the DMRS sequence 320 of the second portion of the respective symbol 310. In some aspects, the additional DMRS sequences 330 may be added between the cyclic prefix 325 and the DMRS sequence 330 of the at least one symbol 310. In some cases, the transmitting wireless device may add an additional DMRS sequence 330 to the sequentially first symbol 310 (e.g., first symbol 310-*a*), to the sequentially last symbol 310 (e.g., fifth symbol 310-*e*) of the burst 305, or both. In additional or alternative cases, the transmitting wireless device may add an additional DMRS sequence 330 to each symbol 310 within the burst 305.

For example, the transmitting wireless device may add an additional DMRS sequence 330-*a* immediately following the cyclic prefix 325-*a* of the first symbol 310-*a*. By way of another example, the transmitting wireless device may add an additional DMRS sequence 330-*e* immediately preceding the DMRS sequence 320-*e* of the fifth symbol 310-*e*. In these examples, the additional DMRS sequence 330-*a* may be identical to the DMRS sequence 320-*a* and/or the cyclic prefix 325-*a*, and the additional DMRS sequence 330-*e* may be identical to the DMRS sequence 320-*e* and/or the cyclic prefix 325-*e*. Moreover, in cases where each of the DMRS sequences 320-*a* through 320-*e* are identical, the additional DMRS sequences 330-*a* and 330-*e* may be identical to each other, each of the DMRS sequences 320-*a* through 320-*e*, each of the cyclic prefixes 325-*a* through 325-*e*, or any combination thereof.

In some cases, parameters (e.g., characteristics) of each of the DMRS sequences 320, cyclic prefixes 325, additional DMRS sequences 330, or any combination thereof, may be based on parameters associated with the wireless channel over which the symbols 310 of the burst 305 are to be transmitted. Parameters associated with the DMRS sequences 320, cyclic prefixes 325, and/or additional DMRS sequences 330 may include, but are not limited to, a length of the respective DMRS sequence 320, cyclic prefix 325, and/or additional DMRS sequence 330. Similarly, parameters of the wireless channel may include, but are not limited to, a frequency selectivity of the wireless channel, a delay spread of the wireless channel, a timing error requirement of the wireless channel, or any combination thereof. For example, in some cases, the length of each of the DMRS sequences 320 and/or the length of each of the additional DMRS sequences may be based on a frequency selectivity of the wireless channel. By way of another example, a length of each of the cyclic prefixes 325 may be based on a delay spread of the wireless channel, a timing error requirement of the wireless channel, or both.

Upon adding the cyclic prefixes 325 to the beginning of each of the respective symbols 310 and/or adding the at least one additional DMRS sequence 330, the transmitting wireless device may transmit each of the symbols 310 (including the cyclic prefixes 325 at the beginning of each respective symbol 310 and/or the additional DMRS sequences 330) in a burst 305 to a receiving wireless device. In some aspects, the transmitting wireless device may transmit the symbols 310 in the burst 305 over a wireless channel using a single-carrier waveform.

In some aspects, the transmitting wireless device may transmit the symbols 310 within the burst 305 sequentially such that sequential symbols 310 are positioned adjacent to one another in the time domain. For example, the transmitting wireless device may transmit the second symbol 310-*a* immediately following the first symbol 310-*a*. In this regard, the transmitting wireless device may transmit the first symbol 310-*a* and the second symbol 310-*b* such that the second portion of the first symbol 310-*a* (e.g., the DMRS sequence 320-*a*) immediately precedes the cyclic prefix 325-*b* of the second symbol 310-*a*. Similarly, the transmitting wireless device may transmit the third symbol 310-*c* immediately following the second symbol 310-*b* such that the second portion of the second symbol 310-*b* (e.g., the DMRS sequence 320-*b*) immediately precedes the cyclic prefix 325-*c* of the third symbol 310-*c*.

By adding a cyclic prefix 325 to the head of each symbol 310, the DMRS sequences 320 may be duplicated, thereby increasing a redundancy of the DMRS sequences 320. Due to the fact that the DMRS sequences 320 are distributed over multiple symbols 310 (e.g., symbols 310-*a* through 310-*e*), the structure of the burst 305 may be intrinsically robust to phase noise, thereby improving the efficiency and reliability of wireless communications. Moreover, the improved DMRS redundancy resulting from duplicated DMRS sequences 320 may facilitate reception and decoding by both frequency-domain receivers as well as time-domain receivers.

For example, in the context of a frequency-domain receiving wireless device, the receiving wireless device may receive the burst 305 including the set of symbols 310 from the transmitting device. In this example, the receiving wireless device may perform channel estimation of the burst 305 based on the DMRS sequences 320, the cyclic prefixes 325, and/or additional DMRS sequences 330 within the respective symbols by performing one or more DFTs. For instance, upon receiving the first symbol 310-*a*, the receiving wireless device may be configured to discard, or otherwise ignore, the cyclic prefix 325-*a* (e.g., the repetition of the DMRS sequence 320-*a* at the beginning of the first symbol 310-*a*) of the first symbol 310-*a* and perform channel estimation by performing a DFT of the additional DMRS sequence 330-*a*. Similarly, by way of another example, the receiving wireless device may be configured to discard, or otherwise ignore, the DMRS sequence 320-*a* and perform channel estimation for the second symbol 310-*b* by performing a DFT of the cyclic prefix 325-*b* (e.g., the repetition of the DMRS sequence 320-*b* at the beginning of the second symbol 310-*b*).

After performing the channel estimation, the frequency-domain receiving wireless device may perform frequency-domain equalization for each symbol 310 based on (e.g., using) the estimation of the channel. For instance, the receiving wireless device may be configured to discard, or otherwise ignore, the cyclic prefix 325-*a* of the first symbol 310-*a* and perform a DFT across/within a Fourier transform window 335-*a* associated with the first symbol 310-*a*. In some aspects, the receiving wireless device may derive frequency-domain equalizer weights based on the channel estimations for the first symbol 310-*a*. Subsequently, the frequency-domain equalizer weights which were derived based on the channel estimate for the first symbol 310-*a* may be applied to the output of the DFT, and an inverse DFT may be performed to convert the equalized frequency-domain symbol 310-*a* back to the time-domain symbol 310-*a*. Similarly, by way of another example, the frequency-domain receiving wireless device may be configured to discard, or otherwise ignore, the cyclic prefix 325-*b* of the second symbol 310-*b* and perform frequency-domain equalization by performing a DFT across/within a Fourier transform window 335-*b* associated with the second symbol 310-*b*. In this example, the receiving wireless device may determine frequency-domain equalizer weights, apply the weights to the output of the DFT of the second symbol 310-*b*, perform an inverse DFT of the second symbol 310-*b*, and convert the frequency-domain symbol 310-*b* to a time-domain symbol 310-*b*, as described previously herein. In some aspects, this procedure may be performed for each symbol 310 within the burst 305.

In some aspects, the receiving wireless device may perform a DFT within each Fourier transform window 335 of each respective symbol 310. In some cases, the transmitting wireless device may generate each of the symbols 310 such that a DFT of the DMRS sequence 320 of each symbol 310 has an equal magnitude, or approximately equal magnitude. In this regard, the transmitting wireless device may generate each of the symbols 310 such that a DFT of the DMRS sequence 320 of each symbol 310 generates a constant, or approximately constant, modulus sequence.

Conversely, in the context of a time-domain receiving wireless device, the receiving wireless device may receive the burst 305 from the transmitting device and may perform channel estimation/equalization of the burst 305 by determining a phase shift between DMRS sequences 320, cyclic prefixes 325, additional DMRS sequences 330, or any combination thereof, within the respective symbols 310. For example, a time-domain receiving wireless device may perform channel estimation/equalization by determining a phase shift between the additional DMRS sequence 330-*a* and the DMRS sequence 325-*a* of the first symbol 310-*a*. By way of another example, the receiving wireless device may estimate the channel by performing a set of time-domain equalizer taps based on (e.g., using) the DMRS sequences 320, the cyclic prefixes 325, and/or the additional DMRS sequences 330.

The structure of the resource allocation scheme 300 illustrated in FIG. 3 may provide for improved single-carrier communications, which may enable more efficient and reliable wireless communications, particularly at higher frequency bands. In particular, the resource allocation scheme 300 may support a time-domain DMRS pattern for single-carrier waveforms which exhibit improved DMRS redundancy, thereby enabling the single-carrier waveforms to be received and decoded by both frequency-domain receivers and time-domain receivers, thereby improving wireless communications within a wireless communications system (e.g., wireless communications system 100, wireless communications system 200, or both).

Figure 4:
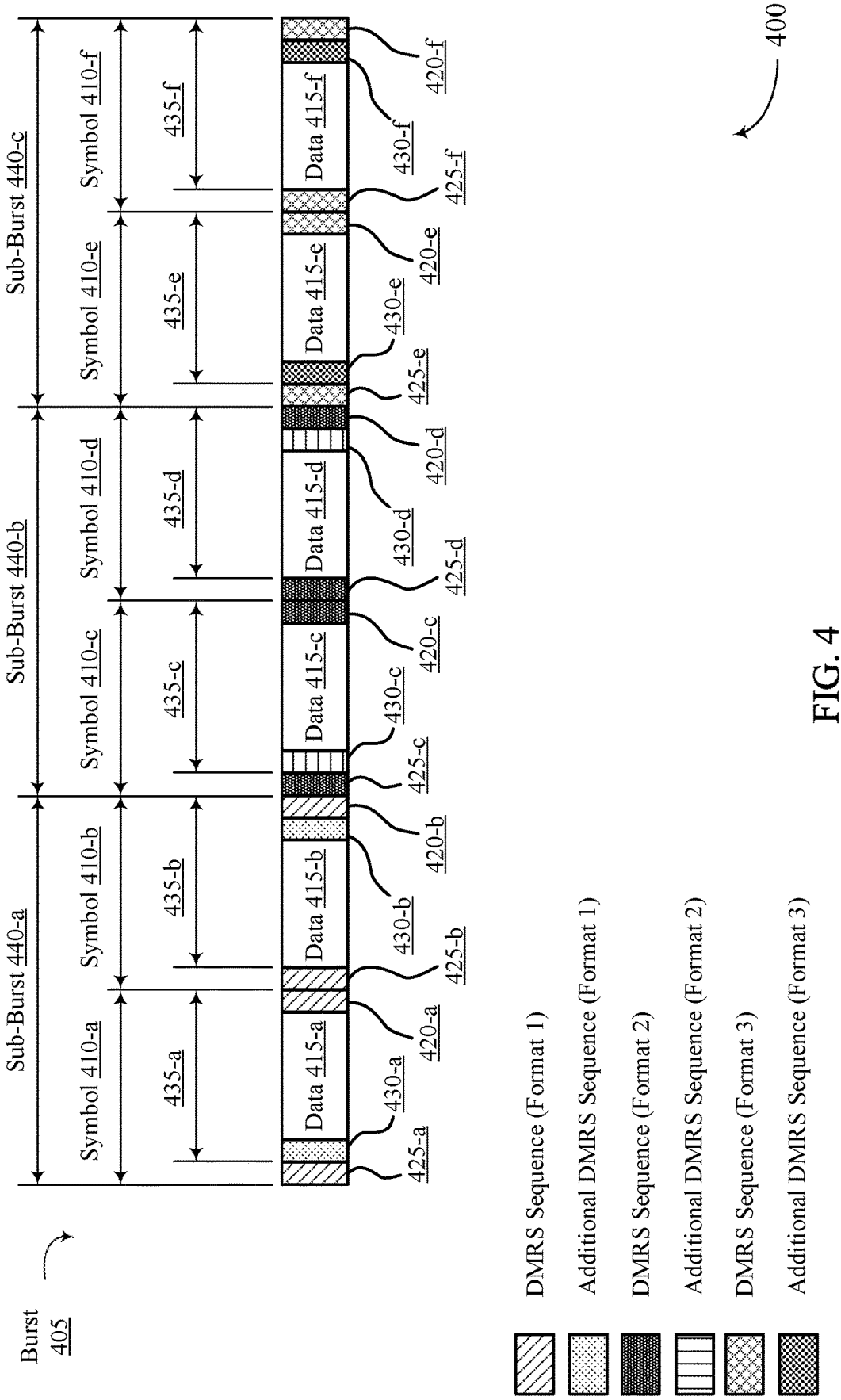
FIG. 4 illustrates an example of a resource allocation scheme that supports time-domain DMRS patterns for single-carrier communication waveform in accordance with aspects of the present disclosure.

FIG. 4 illustrates an example of a resource allocation scheme 400 that supports time-domain DMRS pattern for single-carrier communication waveform in accordance with aspects of the present disclosure. In some examples, resource allocation scheme 400 may implement, or be implemented by, aspects of wireless communications system 100, wireless communications system 200, or both. Moreover, any description associated with the resource allocation scheme 300 may additionally be understood to apply to the resource allocation scheme 400, to the extent applicable.

In some aspects, the resource allocation scheme 400 may illustrate an example burst 405 of symbols 410 which may be transmitted over a wireless channel using a single-carrier waveform, as described previously herein with respect to FIGS. 1-3. For example, in some aspects, a transmitting wireless device (e.g., UE 115, base station 105, or both) may generate a set of symbols 410. For instance, as shown in FIG. 4, the transmitting device may generate a first symbol 410-*a*, a second symbol 410-*b*, a third symbol 410-*c*, a fourth symbol 410-*d*, a fifth symbol 410-*e*, and a sixth symbol 410-*f*. The transmitting wireless device may generate any quantity of symbols which are to be transmitted via the burst 405.

In some aspects, burst 405 may include a set of sub-bursts 440, where each sub-burst 440 includes a set of one or more symbols 410. For example, as shown in FIG. 4, the burst 405 may include a first sub-burst 440-*a*, a second sub-burst 440-*b*, and a third sub-burst 440-*c*. In this example, the first sub-burst 440-*a* may include the first symbol 410-*a* and the second symbol 410-*b*, the second sub-burst 440-*b* may include the third symbol 410-*c* and the fourth symbol 410-*d*, and the third sub-burst 440-*c* may include the fifth symbol 410-*e* and the sixth symbol 410-*f*.

In some aspects, each symbol 410 may include a first portion including a data portion (e.g., data 415) and a second portion including a DMRS sequence 420. The second portion (e.g., DMRS sequence 420) may be positioned at the end of each respective symbol 410. For example, the first symbol 410-*a* may include a first portion including data 415-*a* and a second portion including a DMRS sequence 420-*a* positioned at the end of the first symbol 310-*a*. The DMRS sequence 420 of each symbol 410 may include, but is not limited to, a ZC sequence, a CAZAC sequence, or both.

In some cases, the each DMRS sequence 420 within each of the symbols 410 of each sub-burst 440 may be identical. In this regard, each sub-burst 440 may include a unique DMRS format. For example, in some cases, the DMRS sequences 420-*a* and 420-*b* of the first sub-burst 440-*a* may include a first format (e.g., Format 1) such that each of the DMRS sequences 420 within the first sub-burst 440-*a* are identical. By way of another example, the DMRS sequences 420-*c* and 420-*d* of the second sub-burst 440-*b* may include a second format (e.g., Format 2) different from the first format, and the DMRS sequences 420-*e* and 420-*f* of the third sub-burst 440-*c* may include a third format (e.g., Format 3) different from the first format and/or the second format. In this regard, each respective sub-burst 440 may include a unique DMRS format such that each of the DMRS sequences 420 within each sub-burst 440 are identical to one another.

In some aspects, the transmitting wireless device may add a cyclic prefix 425 including the DMRS sequence 420 in the second portion of each respective symbol 410 to the beginning of each of the respective symbols. In this regard, each of the symbols 410 may include a DMRS sequence 420 at the end of the symbol, and an additional repetition of the DMRS sequence 420 within a cyclic prefix 425 at the beginning of the respective symbol 410. For example, the transmitting wireless device may add a cyclic prefix 425-*a* to the beginning of the first symbol 410-*a*, where the cyclic prefix 425-*a* includes the DMRS sequence 420-*a* at the end of the first symbol 410-*a*. Similarly, by way of another example, the transmitting wireless device may add a cyclic prefix 425-*c* to the beginning of the third symbol 410-*c*, where the cyclic prefix 425-*c* includes the DMRS sequence 420-*c* at the end of the third symbol 410-*c*. In cases where each of the DMRS sequences 420 within each respective sub-burst 440 are identical, each of the cyclic prefixes 425 may also be identical to the other cyclic prefixes 425 as well as the DMRS sequences 420 within the same sub-burst 440.

In some aspects, the transmitting wireless device may add an additional DMRS sequence 430 for at least one symbol 410 of the set of symbols 410. In some aspects, the additional DMRS sequences 430 may be added between the cyclic prefix 425 and the DMRS sequence 430 of the at least one symbol 410. In some cases, the transmitting wireless device may add additional DMRS sequences 430 to the sequentially first symbol 410 of each sub-burst 440, to the sequentially last symbol 410 of each sub-burst 440, or both. In additional or alternative cases, the transmitting wireless device may add an additional DMRS sequence 430 to each symbol 410 within the burst 405.

For example, the transmitting wireless device may add an additional DMRS sequence 430-*a* immediately following the cyclic prefix 425-*a* of the first symbol 410-*a* (e.g., sequentially first symbol 410 of the first sub-burst 440-*a*), and an additional DMRS sequence 430-*b* immediately preceding the DMRS sequence 320-*b* of the second symbol 410-*b* (e.g., sequentially last symbol 410 of the first sub-burst 440-*b*). By way of another example, the transmitting wireless device may add additional DMRS sequences 430-*c* and 430-*e* immediately following the cyclic prefixes 425-*c* and 425-*e* of the respective symbols 410-*c* and 410-*e*, and additional DMRS sequences 430-*d* and 430-*f* immediately preceding the DMRS sequences 420-*d* and 420-*f* of the respective symbols 410-*d* and 410-*f*.

As noted previously herein, parameters (e.g., characteristics) of each of the DMRS sequences 420, cyclic prefixes 425, additional DMRS sequences 430, or any combination thereof, may be based on parameters associated with the wireless channel over which the symbols 410 of the burst 405 are to be transmitted. Parameters associated with the DMRS sequences 420, cyclic prefixes 425, and/or additional DMRS sequences 430 may include, but are not limited to, a length of the respective DMRS sequence 420, cyclic prefix 425, and/or additional DMRS sequence 430. Similarly, parameters of the wireless channel may include, but are not limited to, a frequency selectivity of the wireless channel, a delay spread of the wireless channel, a timing error requirement of the wireless channel, or any combination thereof.

Upon adding the cyclic prefixes 425 to the beginning of each of the respective symbols 410 and/or adding the at least one additional DMRS sequence 430 within the one or more sub-bursts 440, the transmitting wireless device may transmit each of the symbols 410 (including the cyclic prefix 425 at the beginning of each respective symbol 410 and/or the additional DMRS sequences 430) in a burst 405 to a receiving wireless device. In some aspects, the transmitting wireless device may transmit the symbols 410 in the burst 405 over a wireless channel using a single-carrier waveform. As noted previously herein, frequency-domain receiving wireless devices may be configured to perform channel estimation by performing DFTs on/within each of the respective Fourier transform windows 435, and time-domain receiving wireless devices may be configured to perform channel estimation by estimating phase shifts and/or performing a set of time-domain equalizer taps.

The structure of the resource allocation scheme 400 illustrated in FIG. 4 may provide for improved single-carrier communications, which may enable more efficient and reliable wireless communications, particularly at higher frequency bands. In particular, the resource allocation scheme 400 may support a time-domain DMRS pattern for single-carrier waveforms which exhibit improved DMRS redundancy, thereby enabling the single-carrier waveforms to be received and decoded by both frequency-domain receivers and time-domain receivers, thereby improving wireless communications within a wireless communications system (e.g., wireless communications system 100, wireless communications system 200, or both).

Figure 5:
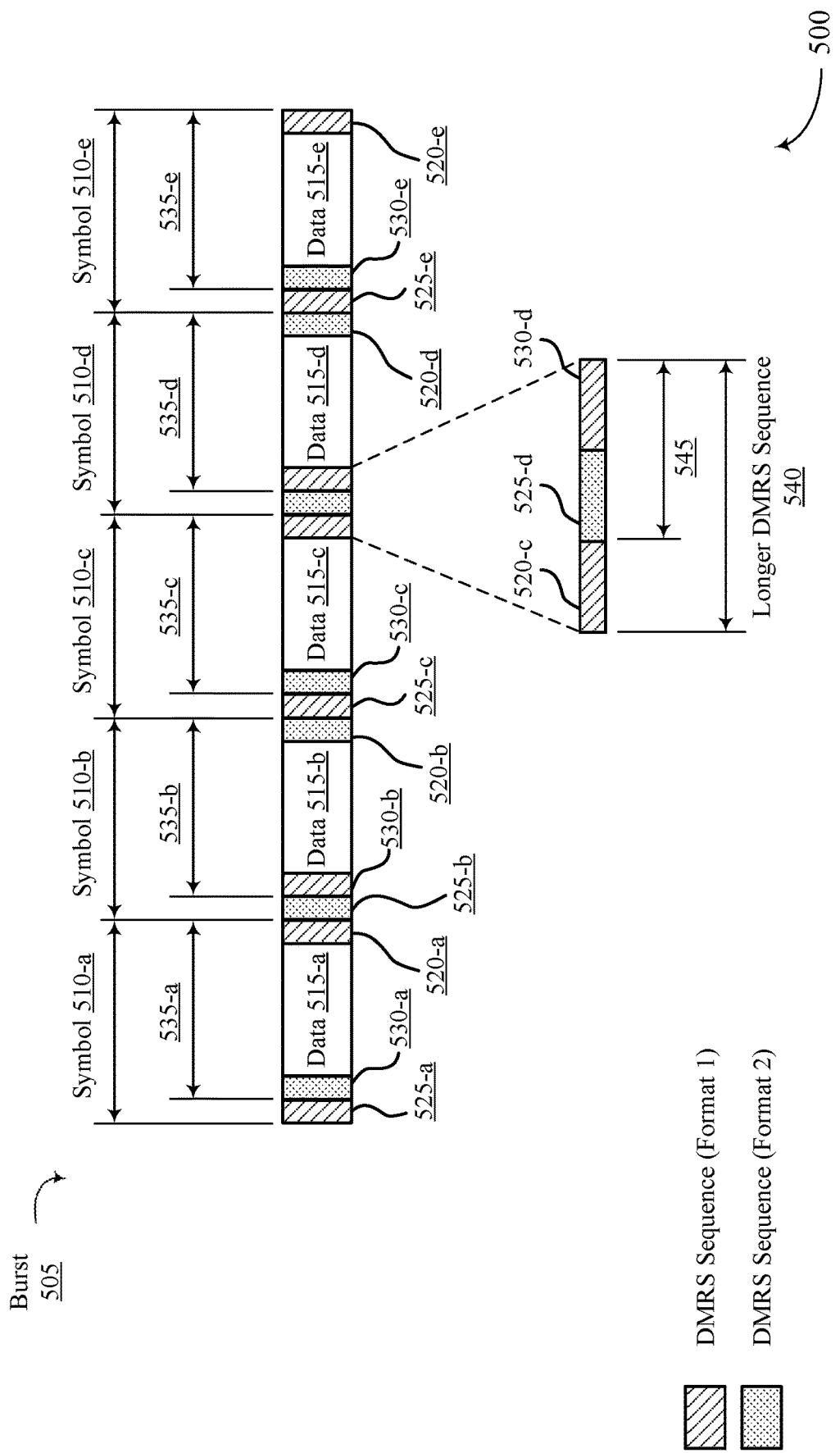
FIG. 5 illustrates an example of a resource allocation scheme that supports time-domain DMRS patterns for single-carrier communication waveform in accordance with aspects of the present disclosure.

FIG. 5 illustrates an example of a resource allocation scheme 500 that supports time-domain DMRS pattern for single-carrier communication waveform in accordance with aspects of the present disclosure. In some examples, resource allocation scheme 500 may implement, or be implemented by, aspects of wireless communications system 100, wireless communications system 200, or both. Moreover, any description associated with the resource allocation scheme 300, resource allocation scheme 400, or both, may additionally be understood to apply to the resource allocation scheme 500, to the extent applicable.

In some aspects, the resource allocation scheme 500 may illustrate an example burst 505 of symbols 510 which may be transmitted over a wireless channel using a single-carrier waveform, as described previously herein with respect to FIGS. 1-4. For example, in some aspects, a transmitting wireless device (e.g., UE 115, base station 105, or both) may generate a set of symbols 510. For instance, as shown in FIG. 5, the transmitting device may generate a first symbol 510-a, a second symbol 510-b, a third symbol 510-c, a fourth symbol 510-d, and a fifth symbol 510-e. The transmitting wireless device may generate any quantity of symbols which are to be transmitted via the burst 505.

In some aspects, each symbol 510 may include a first portion including a data portion (e.g., data 515) and a second portion including a DMRS sequence 520. The second portion (e.g., DMRS sequence 520) may be positioned at the end of each respective symbol 510. For example, the first symbol 510-a may include a first portion including data 515-a and a second portion including a DMRS sequence 520-a positioned at the end of the first symbol 510-a. The DMRS sequence 520 of each symbol 510 may include, but is not limited to, a ZC sequence, a CAZAC sequence, or both.

In some aspects, the transmitting wireless device may add a cyclic prefix 525 including the DMRS sequence 520 in the second portion of each respective symbol 510 to the beginning of each of the respective symbols 510. In this regard, each of the symbols 510 may include a DMRS sequence 520 at the end of the symbol, and an additional repetition of the DMRS sequence 520 within a cyclic prefix 525 at the beginning of the respective symbol 510. For example, the transmitting wireless device may add a cyclic prefix 525-a to the beginning of the first symbol 510-a, where the cyclic prefix 525-a includes the DMRS sequence 520-a at the end of the first symbol 510-a. Similarly, by way of another example, the transmitting wireless device may add a cyclic prefix 525-b to the beginning of the second symbol 510-b, where the cyclic prefix 525-b includes the DMRS sequence 520-b at the end of the second symbol 510-b.

In some aspects, the transmitting wireless device may add an additional DMRS sequence 530 for at least one symbol 510 of the set of symbols 510. In some aspects, the additional DMRS sequences 530 may be added between the cyclic prefix 525 and the DMRS sequence 520 of the at least one symbol 510. In some cases, the transmitting wireless device may add additional DMRS sequences 530 to each symbol 510 of the set of symbols 510 within the burst 505. In some aspects, the additional DMRS sequences 530 may include the same format or a different format as the DMRS sequence 520 at the end of the respective symbols.

For example, the transmitting wireless device may add an additional DMRS sequence 530-a immediately following the cyclic prefix 525-a of the first symbol 510-a. In this example, the DMRS sequence 520-a and the cyclic prefix 525-a may include a first format (Format 1), and the additional DMRS sequence 530-a may include a second format (Format 2) different from the first format. By way of another example, the transmitting wireless device may add an additional DMRS sequence 530-b immediately following the cyclic prefix 525-b of the second symbol 510-b. In this example, the DMRS sequence 520-b and the cyclic prefix 525-b may include the second format (Format 2), and the additional DMRS sequence 530-b may include the first format (Format 1).

In some aspects, the DMRS sequences 520 at the end of each respective symbol 510, the cyclic prefixes 525 at the beginning of each respective symbol 510, and/or the additional DMRS sequences 530 added into the one or more symbols 510 may include sub-sequences of a longer DMRS sequence 540. For example, as shown in FIG. 5, the DMRS sequence 520-c of the third symbol 510-c, the cyclic prefix 525-d of the fourth symbol 510-d, and the additional DMRS sequence 530-d of the fourth symbol 510-d may each include sub-sequences of the longer DMRS sequence 540. In this example, the portion 545 of the longer DMRS sequence 540 including the cyclic prefix 525-d and the additional DMRS sequence 530-d may include the portion 545 which is used for channel estimation, where the DMRS sequence 520-c of the third symbol 510-c may be regarded as the cyclic prefix for the portion 545.

In some aspects, each sub-sequence of the longer DMRS sequence 540 (e.g., DMRS sequence 520-d, cyclic prefix 525-d, additional DMRS sequence 530-d) may be identical in length with respect to the time domain (e.g., include an identical time duration). In some cases, the length (e.g., time duration) of each sub-sequence of the longer DMRS sequence 540 may be configured and/or selectively adjusted based on a channel condition of the wireless channel, a type of receiver which is to receive the burst 505 (e.g., time-domain receiver, frequency-domain receiver), or any combination thereof.

In some aspects, the sub-sequences of the longer DMRS sequence may be shifted according to a cyclical shift pattern for each sequential symbol 510 of the set of symbols 510. For example, as may be seen in FIG. 5, the longer DMRS sequence 540 may be shifted according to a cyclical shift pattern such that a first iteration of the longer DMRS sequence 540 of the first symbol 510-*a* is arranged according to Format 1-Format 2-Format 1, and a second iteration of the longer DMRS sequence 540 of the second symbol 510-*b* is arranged according to Format 2-Format 1-Format 2. In this example, the longer DMRS sequence 540 may be shifted according to the cyclical shift pattern such that a $(k+1)^{th}$ sub-sequence of the first iteration of the longer DMRS sequence 540 of a symbol 510 comprises a $k^{th}$ sub-sequence of a subsequent iteration of the longer DMRS sequence 540 of the subsequent symbol 510. The concepts of the longer DMRS sequence 540 and the cyclical shift pattern will be discussed in further detail herein with respect to FIG. 6.

In some aspects, parameters (e.g., characteristics) of each of the DMRS sequences 520, cyclic prefixes 525, additional DMRS sequences 530, or any combination thereof, may be based on parameters associated with the wireless channel over which the symbols 510 of the burst 505 are to be transmitted. Parameters associated with the DMRS sequences 520, cyclic prefixes 525, and/or additional DMRS sequences 530 may include, but are not limited to, a length of the respective DMRS sequence 520, cyclic prefix 525, and/or additional DMRS sequence 530. Similarly, parameters of the wireless channel may include, but are not limited to, a frequency selectivity of the wireless channel, a delay spread of the wireless channel, a timing error requirement of the wireless channel, or any combination thereof.

Upon adding the cyclic prefixes 525 to the beginning of each of the respective symbols 510 and/or adding the at least one additional DMRS sequence 530, the transmitting wireless device may transmit each of the symbols 510 (including the cyclic prefixes 525 at the beginning of each respective symbol 510 and/or the additional DMRS sequences 530) in a burst 505 to a receiving wireless device. In some aspects, the transmitting wireless device may transmit the symbols 510 in the burst 505 over a wireless channel using a single-carrier waveform. As noted previously herein, frequency-domain receiving wireless devices may be configured to perform channel estimation by performing DFTs on/within each of the respective Fourier transform windows 535, and time-domain receiving wireless devices may be configured to perform channel estimation by estimating phase shifts and/or performing a set of time-domain equalizer taps.

The structure of the resource allocation scheme 500 illustrated in FIG. 5 may provide for improved single-carrier communications, which may enable more efficient and reliable wireless communications, particularly at higher frequency bands. In particular, the resource allocation scheme 500 may support a time-domain DMRS pattern for single-carrier waveforms which exhibit improved DMRS redundancy, thereby enabling the single-carrier waveforms to be received and decoded by both frequency-domain receivers and time-domain receivers, thereby improving wireless communications within a wireless communications system (e.g., wireless communications system 100, wireless communications system 200, or both).

Figure 6:
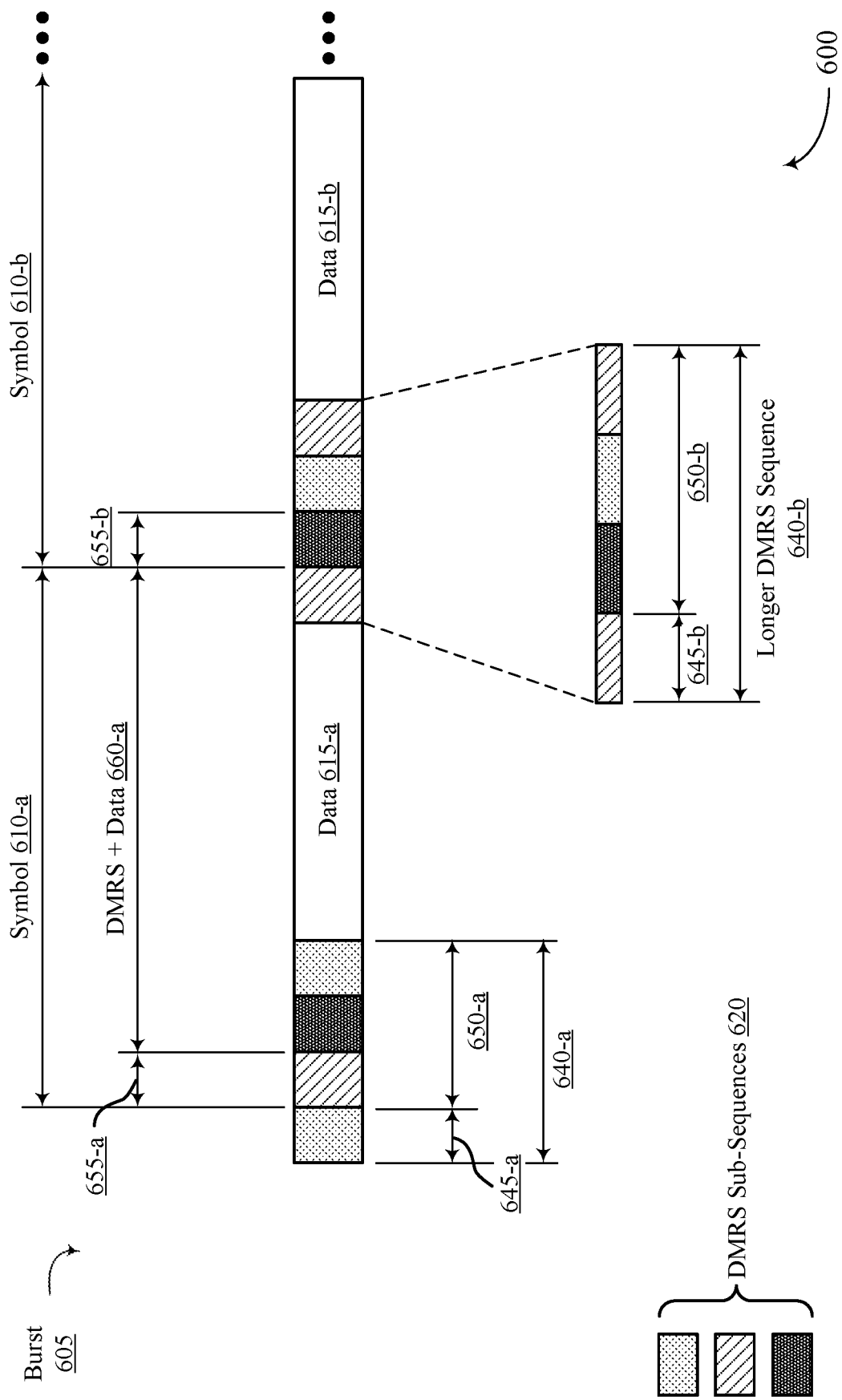
FIG. 6 illustrates an example of a resource allocation scheme that supports time-domain DMRS patterns for single-carrier communication waveform in accordance with aspects of the present disclosure.

FIG. 6 illustrates an example of a resource allocation scheme 600 that supports time-domain DMRS pattern for single-carrier communication waveform in accordance with aspects of the present disclosure. In some examples, resource allocation scheme 600 may implement, or be implemented by, aspects of wireless communications system 100, wireless communications system 200, or both. Moreover, any description associated with the resource allocation scheme 300, 400, 500, or any combination thereof, may additionally be understood to apply to the resource allocation scheme 600, to the extent applicable.

In some aspects, the resource allocation scheme 600 may illustrate an example burst 605 of symbols 610 which may be transmitted over a wireless channel using a single-carrier waveform, as described previously herein with respect to FIGS. 1-5. For example, in some aspects, a transmitting wireless device (e.g., UE 115, base station 105, or both) may generate a set of symbols 610. For instance, as shown in FIG. 6, the transmitting device may generate a first symbol 610-*a*, and a second symbol 610-*b*. The transmitting wireless device may generate any quantity of symbols 610 which are to be transmitted via the burst 605.

In some aspects, as noted previously herein, DMRS sequences within the burst 605 may include sub-sequences of a longer DMRS sequence 640. For example, as shown in FIG. 6, at least a portion of a first iteration of a longer DMRS sequence 640-*a* may be positioned within the first symbol 610-*a*, and at least a portion of a second iteration of a longer DMRS sequence 640-*b* may be positioned within the second symbol 610-*b*. In some aspects, the portions 645-*a* and 645-*b* may include cyclic prefixes for the remaining portions 650-*a* and 650-*b* of the respective iterations of the longer DMRS sequences 640-*a* and 640-*b*. Similarly, the portions 655-*a* and 655-*b* may include cyclic prefixes for the portions including DMRS sequences and data 615 (e.g., portion 660-*a*).

In some aspects, each sub-sequence 620 of the longer DMRS sequence 640 be identical in length with respect to the time domain (e.g., include an identical time duration). In some cases, the length (e.g., time duration) of each sub-sequence 620 of the longer DMRS sequence 640 may be configured and/or selectively adjusted based on a channel condition of the wireless channel, a type of receiver which is to receive the burst 605 (e.g., time-domain receiver, frequency-domain receiver), or any combination thereof.

In some aspects, the sub-sequences 620 of the longer DMRS sequence 640 may be shifted according to a cyclical shift pattern for each sequential symbol 610 of the set of symbols 610. For example, as may be seen in FIG. 6, the longer DMRS sequence 640 may be shifted according to a cyclical shift pattern such that a first iteration of the longer DMRS sequence 640-*a* of the first symbol 610-*a* and a second iteration of the longer DMRS sequence 640-*b* of the second symbol 610-*b* exhibit a cyclic-shift relationship.

Additionally or alternatively, the longer DMRS sequence 640 illustrated in FIG. 6 may be shifted according to a cyclical shift pattern defined by Equation 1:

$$p'_k(n)=p((Mk+n)\bmod N), n=0,\ldots,N-1 \quad (1)$$

where k defines the $k^{th}$ symbol, p(n) defines the DMRS sequence with, $n=0, \ldots, N-1$, and mod N defines a modular sequence. For example, the portion 650-*a* may be defined as a DMRS sequence $p(0), \ldots, p(N-1)$ and portion 650-*b* may be defined as $p(M), \ldots, p(N-1), p(0), \ldots, p(M-1)$.

The structure of the resource allocation scheme 600 illustrated in FIG. 6 may provide for improved single-carrier communications, which may enable more efficient and reliable wireless communications, particularly at higher frequency bands. In particular, the resource allocation scheme 600 may support a time-domain DMRS pattern for single-carrier waveforms which exhibit improved DMRS redundancy, thereby enabling the single-carrier waveforms to be received and decoded by both frequency-domain receivers and time-domain receivers, thereby improving wireless communications within a wireless communications system (e.g., wireless communications system 100, wireless communications system 200, or both).

Figure 7:
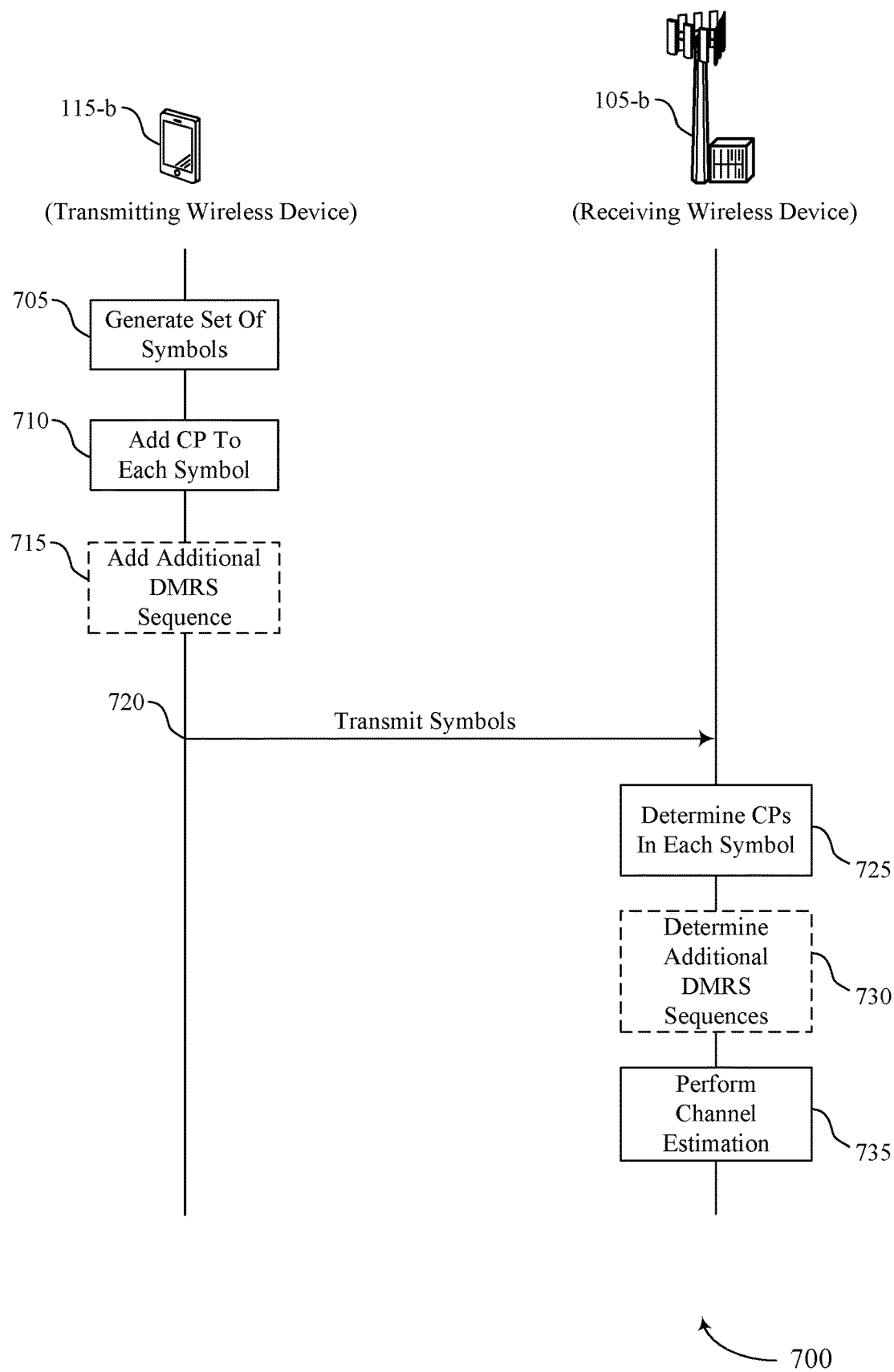
FIG. 7 illustrates an example of a process flow that supports time-domain DMRS patterns for single-carrier communication waveform in accordance with aspects of the present disclosure.

FIG. 7 illustrates an example of a process flow 700 that supports time-domain DMRS pattern for single-carrier communication waveform in accordance with aspects of the present disclosure. In some examples, process flow 700 may implement, or be implemented by, aspects of wireless communications system 100, wireless communications system 200, resource allocations schemes 300, 400, 500, 600, or any combination thereof. For example, the process flow 700 may illustrate generating a set of symbols including DMRS sequences, adding a cyclic prefix to a beginning of each symbol of the set of symbols, adding at least one additional DMRS sequences to at least one symbol, and transmitting the set of symbols in a burst over a wireless channel using a single-carrier waveform, as described with reference to FIGS. 1-6, among other aspects. The process flow 700 may include a UE 115-*b* and a base station 105-*b*, which may be examples of UEs 115 and base stations 105, as described with reference to FIGS. 1 and 2.

In some examples, the operations illustrated in process flow 700 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

For the purposes of simplicity, the UE 115-*b* illustrated in FIG. 7 is shown and described as including a transmitting wireless device, and the base station 105-*b* is shown and described as a receiving wireless device. However, this is solely for illustrative purposes, as both the UE 115-*b* and the base station 105-*b* may be configured to operate as a transmitting wireless device, a receiving wireless device, or both. In this regard, any steps/functions shown and described as being carried out by the UE 115-*b* may additionally or alternatively be understood to be carried out by the base station 105-*b*. Similarly, any steps/functions shown and described as being carried out by the base station 105-*b* may additionally or alternatively be understood to be carried out by the UE 115-*b*.

At 705, the UE 115-*b* may generate a set of symbols which are to be transmitted to the base station 105-*b*. For example, as shown in FIGS. 3-6, the UE 115-*b* may generate any quantity of symbols which are to be transmitted in a burst over a wireless channel using a single-carrier waveform. In some aspects, each symbol may include a first portion including data and a second portion including a DMRS sequence. The second portion (e.g., DMRS sequence) may be positioned at the end of each respective symbol. The DMRS sequence of each symbol may include, but is not limited to, a ZC sequence, a CAZAC sequence, or both.

In some cases, the each DMRS sequence within each of the symbols of the burst may be identical. Additionally or alternatively, a burst may include one or more sub-bursts, where the DMRS sequences within each sub-burst are identical. For example, a burst may include a first sub-burst including a first set of one or more symbols, and a second sub-burst including a second set of one or more symbols. In this example, the UE 115-*b* may generate the symbols such that the first set of one or more symbols include a first format of DMRS sequences, and the second set of one or more symbols include a second format of DMRS sequences different from the first format.

At 710, the UE 115-*b* may add a cyclic prefix including a repetition of the DMRS sequence in the second portion of each respective symbol to the beginning of each of the respective symbols. In this regard, each of the symbols may include a DMRS sequence at the end of the symbol, and an additional repetition of the DMRS sequence within a cyclic prefix at the beginning of the respective symbol. For example, the transmitting wireless device may add a first cyclic prefix to the beginning of a first symbol, where the first cyclic prefix includes the DMRS sequence at the end of the first symbol (e.g., the DMRS sequence within the second portion of the first symbol). Similarly, by way of another example, the UE 115-*b* may add a second cyclic prefix to the beginning of a second symbol, where the second cyclic prefix includes the DMRS sequence at the end of the second symbol. In some aspects, the UE 115-*b* may add the cyclic prefixes at 710 based on generating the set of symbols at 705.

At 715, the UE 115-*b* may add an additional DMRS sequence for at least one symbol of the set of symbols. In some aspects, the additional DMRS sequences may be added between the cyclic prefix and the DMRS sequence of the at least one symbol. In some cases, the UE 115-*b* may add an additional DMRS sequence to the sequentially first symbol of the burst, to the sequentially last symbol of the burst, or both. For example, the UE 115-*b* may add an additional DMRS sequence immediately following the cyclic prefix at the beginning of the first symbol within the burst, and an additional DMRS sequence immediately preceding the DMRS sequence at the end of the last symbol within the burst. In additional or alternative cases, the UE 115-*b* may add an additional DMRS sequence to the sequentially first symbol of each sub-burst within the burst, to the sequentially last symbol of each sub-burst within the burst, or both. In additional or alternative cases, the UE 115-*b* may add an additional DMRS sequence to every symbol within the burst. In some aspects, the UE 115-*b* may add the one or more additional DMRS sequences at 715 based on generating the set of symbols at 705, adding the cyclic prefixes at 710, or both.

At 720, the UE 115-*b* may transmit each of the symbols (including the cyclic prefixes at the beginning of each respective symbol and/or the additional DMRS sequences) in the burst to the base station 105-*b*. In some aspects, the UE 115-*b* may transmit the symbols in the burst over a wireless channel using a single-carrier waveform. The UE 115-*b* may transmit the symbols at 720 based on generating the set of symbols at 705, adding the cyclic prefixes at 720, adding the one or more additional DMRS sequences at 715, or any combination thereof.

In some aspects, the UE 115-*b* may transmit the symbols within the burst sequentially such that sequential symbols are positioned adjacent to one another in the time domain. For example, the UE 115-*b* may transmit the second symbol immediately following the first symbol such that the second portion of the first symbol (e.g., the DMRS sequence of the first symbol) immediately precedes the cyclic prefix of the second symbol. Similarly, the UE 115-*b* may transmit the third symbol immediately following the second symbol such that the second portion of the second symbol (e.g., the DMRS sequence of the second symbol) immediately precedes the cyclic prefix of the third symbol.

At 725, the base station 105-b may determine the cyclic prefixes within each symbol of the burst. By adding a cyclic prefix to the head of each symbol, the DMRS sequences may be duplicated, thereby increasing a redundancy of the DMRS sequences within the burst. This improved DMRS redundancy resulting from duplicated DMRS sequences may facilitate reception and decoding by both frequency-domain receivers as well as time-domain receivers.

At 730, the base station 105-b may determine the additional DMRS sequences within the at least one symbol of the burst. For example, in cases where the UE 115-b adds an additional DMRS sequence to the sequentially first symbol of the burst and the sequentially last symbol of the bust, the base station 105-b may determine (e.g., identify) the additional DMRS sequences within the sequentially first and sequentially last symbols of the burst.

At 735, the base station 105-b may perform channel estimation on the received symbols (e.g., channel estimation on the received burst). In some aspects, the base station 105-b may perform channel estimation based on receiving the symbols at 720, determining the cyclic prefixes at 725, determining the additional DMRS sequences at 730, or any combination thereof.

In some aspects, the base station 105-b may perform channel estimation differently dependent on whether the base station 105-b serves as a frequency-domain receiver or a time-domain receiver. For example, in the context of a frequency-domain receiving wireless device, the base station 105-b perform channel estimation of the burst based on the DMRS sequences within the respective symbols of the burst by performing a DFT of each of the symbols. For example, the base station 105-b may perform a DFT of each symbol (e.g., each DMRS sequence and/or additional DMRS sequences of each symbol) within the burst. For instance, upon receiving the first symbol of the burst, the base station 105-b may be configured to discard, or otherwise ignore, the cyclic prefix of the first symbol and perform channel estimation by performing a DFT across/within a Fourier transform window associated with the first symbol. In this example, Fourier transform window associated with the first symbol may include the DMRS sequence and/or an additional DMRS sequence. The base station 105-b may be configured to similarly perform DFTs within/across each symbol within the burst. After performing the channel estimation, the base station 105-b may perform frequency-domain equalization for each symbol based on (e.g., using) the estimation of the channel.

Conversely, in the context of a time-domain receiver, the base station 105-b may receive the burst from the UE 115-b and may perform channel estimation/equalization of the burst by determining a phase shift between DMRS sequences, cyclic prefixes, additional DMRS sequences, or any combination thereof, within the respective symbols. For example, the base station 105-b may perform channel estimation/equalization by determining a phase shift between the additional DMRS sequence following the cyclic prefix at the beginning of the first symbol and the DMRS sequence at the end of the first symbol. By way of another example, the base station 105-b may estimate the channel by performing a set of time-domain equalizer taps based on (e.g., using) the DMRS sequences, the cyclic prefixes, and/or the additional DMRS sequences within the respective symbols.

The techniques described herein may provide for improved single-carrier communications, which may enable more efficient and reliable wireless communications, particularly at higher frequency bands. In particular, the techniques described herein may support a time-domain DMRS pattern for single-carrier waveforms which exhibit improved DMRS redundancy, thereby enabling the single-carrier waveforms to be received and decoded by both frequency-domain receivers and time-domain receivers, thereby improving wireless communications within a wireless communications system (e.g., wireless communications system 100, wireless communications system 200, or both).

Figure 8:
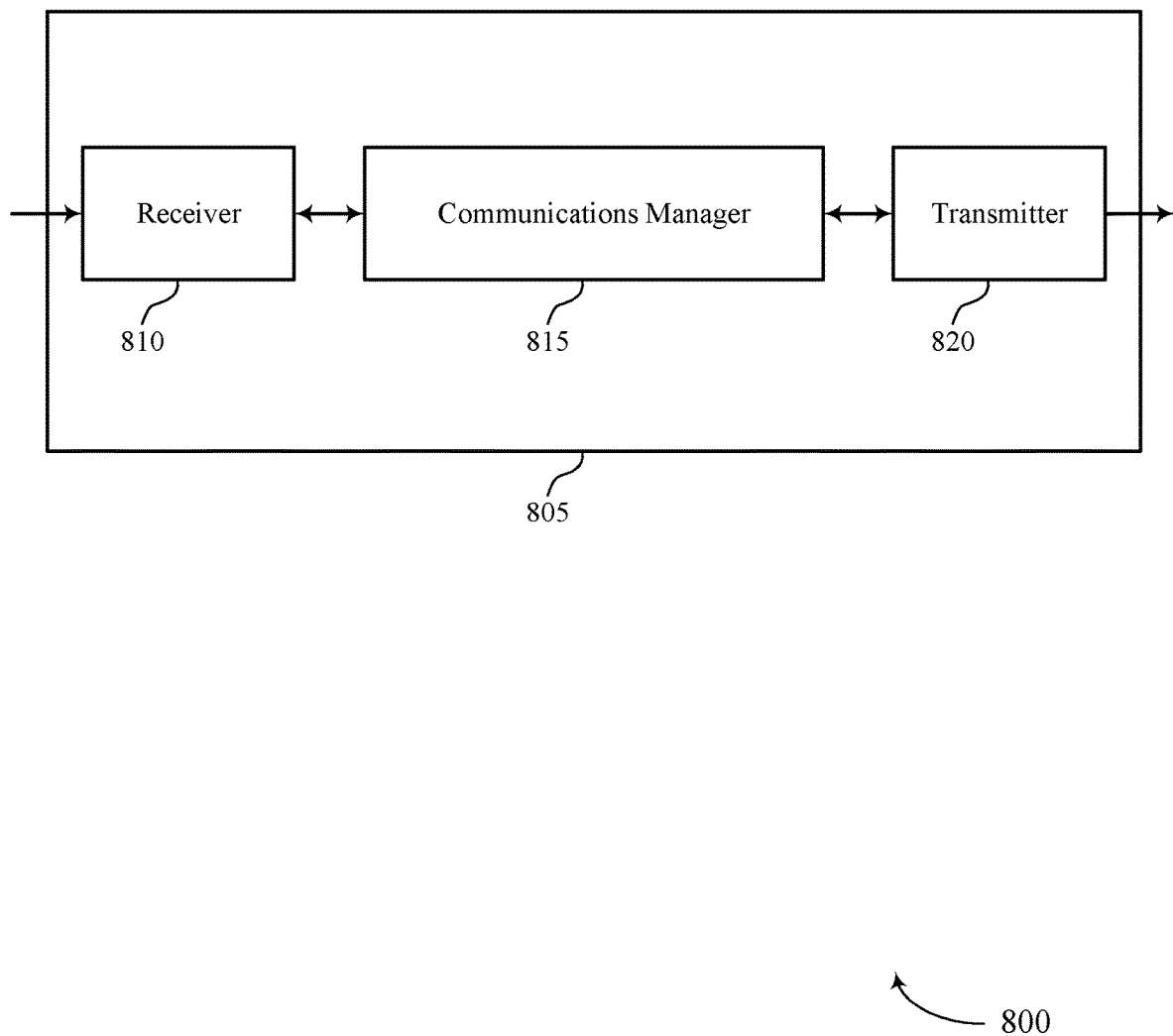
FIGS. 8 and 9 show block diagrams of devices that support time-domain DMRS patterns for single-carrier communication waveform in accordance with aspects of the present disclosure.

FIG. 8 shows a block diagram 800 of a device 805 that supports time-domain DMRS pattern for single-carrier communication waveform in accordance with aspects of the present disclosure. The device 805 may be an example of aspects of a UE 115 or base station 105 as described herein. The device 805 may include a receiver 810, a communications manager 815, and a transmitter 820. The device 805 may also include a processor. Each of these components may be in communication with one another (e.g., via one or more buses).

Receiver 810 may receive information such as packets, user data, or control information associated with various information channels (e.g., control channels, data channels, and information related to time-domain DMRS pattern for single-carrier communication waveform, etc.). Information may be passed on to other components of the device 805. The receiver 810 may be an example of aspects of the transceiver 1120 or 1220 as described with reference to FIGS. 11 and 12. The receiver 810 may utilize a single antenna or a set of antennas.

The communications manager 815 may generate a set of symbols, where each symbol of the set of symbols includes a first portion including data and a second portion including a DMRS sequence, where the second portion of each symbol is positioned at the end of the respective symbol, add, to a beginning of each symbol in the set of symbols, a cyclic prefix including the DMRS sequence in the second portion of the respective symbol, and transmit the set of symbols, including the cyclic prefix at the beginning of each respective symbol, in a burst over a wireless channel using a single-carrier waveform. The communications manager 815 may also receive, over a wireless channel via a single-carrier waveform, a burst including a set of symbols, where each symbol of the set of symbols includes a first portion including data and a second portion including a DMRS sequence, where the second portion of each symbol is positioned at the end of the respective symbol, determine, at a beginning of each symbol in the set of symbols, a cyclic prefix including the DMRS sequence in the second portion of the respective symbol, and perform a channel estimation of the wireless channel based on the DMRS sequence. The communications manager 815 may be an example of aspects of the communications manager 1110 or 1210 as described herein.

The actions performed by the communications manager 815 as described herein may be implemented to realize one or more potential advantages. For example, enabling time-domain DMRS patterns for single-carrier waveforms may lead to more efficient use of time and frequency resources. Additionally, the time-domain DMRS patterns described herein may enable single-carrier waveforms to be received and decoded by both frequency-domain receivers and time-domain receivers. Moreover, the time-domain DMRS patterns for single-carrier waveforms may improve wireless communications particularity within high frequency bands, thereby improving the efficiency and reliability of the wireless communications. Such improvements in wireless communications may thereby reduce a quantity of retransmissions which must be performed, reduce power consumption at the UE 115 and/or base station 105, and alleviate network overhead.

Based on generating and/or receiving time-domain DMRS patterns for single-carrier waveforms, a processor of the UE 115 and/or base station 105 (e.g., a processor controlling the receiver 810, the communications manager 815, the transmitter 820, etc.) may reduce processing resources used for wireless communications. For example, by improving the efficiency and reliability of wireless communications, particularly in high frequency bands, quantities of retransmissions needed to communicate data may be reduced, thereby reducing a number of times the processor ramps up processing power and turns on processing units to handle downlink reception and uplink transmission.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 820 may transmit signals generated by other components of the device 805. In some examples, the transmitter 820 may be collocated with a receiver 810 in a transceiver module. For example, the transmitter 820 may be an example of aspects of the transceiver 1120 or 1220 as described with reference to FIGS. 11 and 12. The transmitter 820 may utilize a single antenna or a set of antennas.

Figure 9:
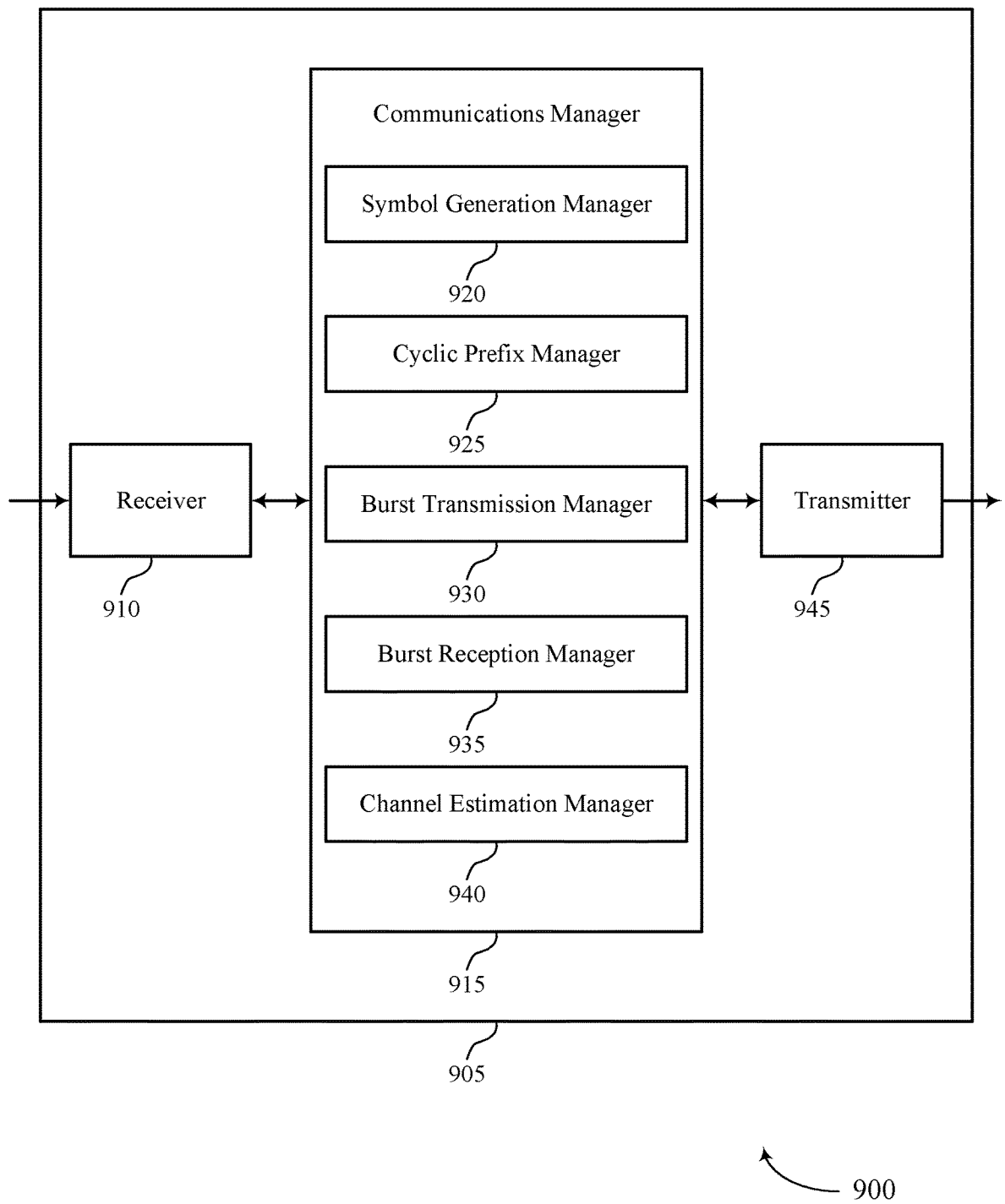

FIG. 9 shows a block diagram 900 of a device 905 that supports time-domain DMRS pattern for single-carrier communication waveform in accordance with aspects of the present disclosure. The device 905 may be an example of aspects of a device 805, a UE 115, or a base station 105 as described herein. The device 905 may include a receiver 910, a communications manager 915, and a transmitter 945. The device 905 may also include a processor. Each of these components may be in communication with one another (e.g., via one or more buses).

Receiver 910 may receive information such as packets, user data, or control information associated with various information channels (e.g., control channels, data channels, and information related to time-domain DMRS pattern for single-carrier communication waveform, etc.). Information may be passed on to other components of the device 905. The receiver 910 may be an example of aspects of the transceiver 1120 or 1220 as described with reference to FIGS. 11 and 12. The receiver 910 may utilize a single antenna or a set of antennas.

The communications manager 915 may be an example of aspects of the communications manager 815 as described herein. The communications manager 915 may include a symbol generation manager 920, a cyclic prefix manager 925, a burst transmission manager 930, a burst reception manager 935, and a channel estimation manager 940. The communications manager 915 may be an example of aspects of the communications manager 1110 or 1210 as described herein.

The symbol generation manager 920 may generate a set of symbols, where each symbol of the set of symbols includes a first portion including data and a second portion including a DMRS sequence, where the second portion of each symbol is positioned at the end of the respective symbol.

The cyclic prefix manager 925 may add, to a beginning of each symbol in the set of symbols, a cyclic prefix including the DMRS sequence in the second portion of the respective symbol.

The burst transmission manager 930 may transmit the set of symbols, including the cyclic prefix at the beginning of each respective symbol, in a burst over a wireless channel using a single-carrier waveform.

The burst reception manager 935 may receive, over a wireless channel via a single-carrier waveform, a burst including a set of symbols, where each symbol of the set of symbols includes a first portion including data and a second portion including a DMRS sequence, where the second portion of each symbol is positioned at the end of the respective symbol.

The cyclic prefix manager 925 may determine, at a beginning of each symbol in the set of symbols, a cyclic prefix including the DMRS sequence in the second portion of the respective symbol.

The channel estimation manager 940 may perform a channel estimation of the wireless channel based on the DMRS sequence.

Transmitter 945 may transmit signals generated by other components of the device 905. In some examples, the transmitter 945 may be collocated with a receiver 910 in a transceiver module. For example, the transmitter 945 may be an example of aspects of the transceiver 1120 or 1220 as described with reference to FIGS. 11 and 12. The transmitter 945 may utilize a single antenna or a set of antennas.

Figure 10:
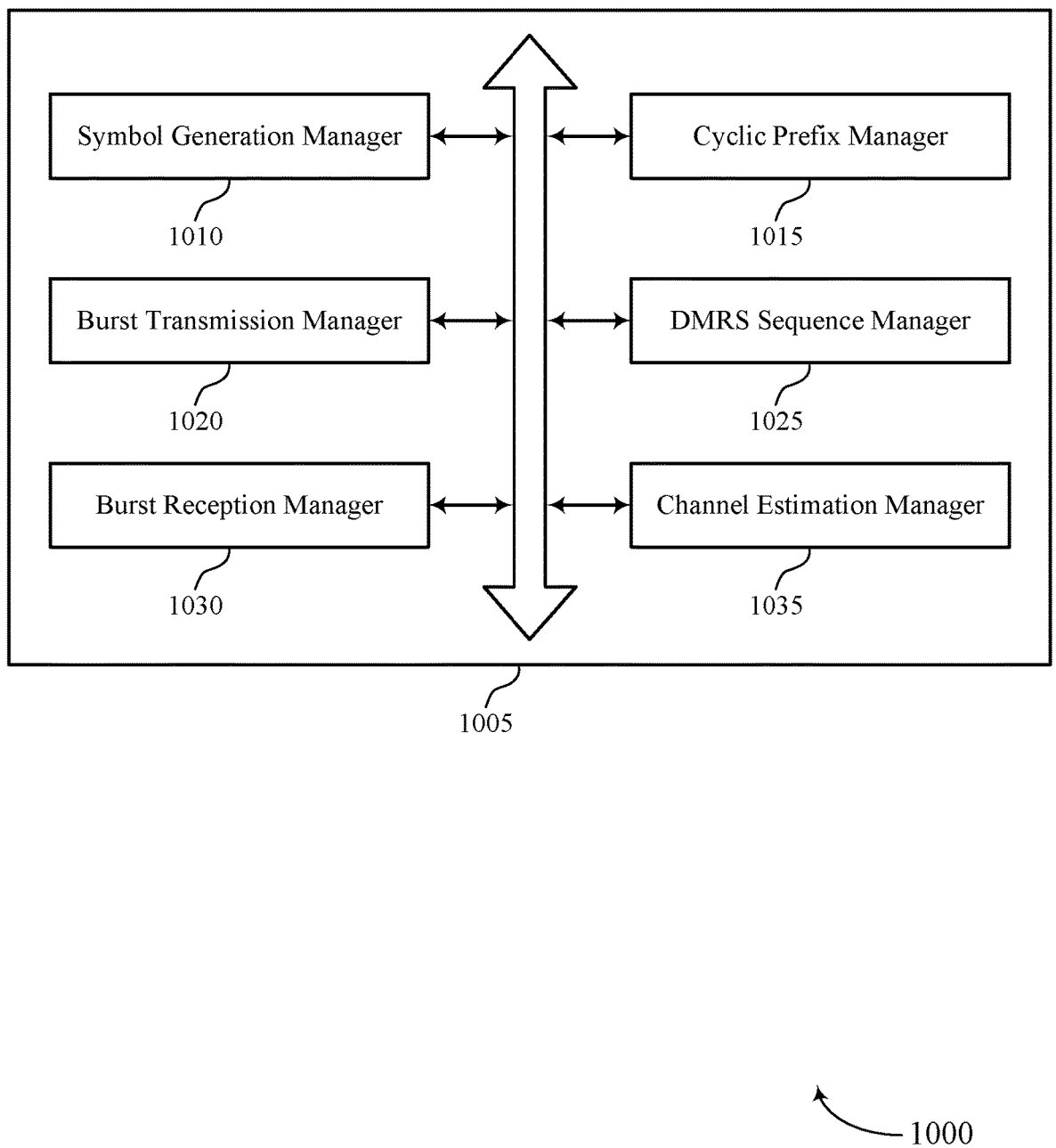
FIG. 10 shows a block diagram of a communications manager that supports time-domain DMRS patterns for single-carrier communication waveform in accordance with aspects of the present disclosure.

FIG. 10 shows a block diagram 1000 of a communications manager 1005 that supports time-domain DMRS pattern for single-carrier communication waveform in accordance with aspects of the present disclosure. The communications manager 1005 may be an example of aspects of a communications manager 815, a communications manager 915, or a communications manager 1110 described herein. The communications manager 1005 may include a symbol generation manager 1010, a cyclic prefix manager 1015, a burst transmission manager 1020, a DMRS sequence manager 1025, a burst reception manager 1030, and a channel estimation manager 1035. Each of these modules may communicate, directly or indirectly, with one another (e.g., via one or more buses).

The symbol generation manager 1010 may generate a set of symbols, where each symbol of the set of symbols includes a first portion including data and a second portion including a DMRS sequence, where the second portion of each symbol is positioned at the end of the respective symbol. In some cases, the burst includes a set of sub-bursts, where the at least one symbol includes a sequentially first symbol in each sub-burst. In some cases, the set of sub-bursts include a first sub-burst including a first set of symbols and a second sub-burst including a second set of symbols, where each DMRS sequence within each of the first set of symbols include a first format, and where each DMRS sequence within each of the second set of symbols include a second format different from the first format. In some cases, the at least one symbol of the set of symbols further includes a sequentially last symbol in each sub-burst of the set of sub-bursts.

The cyclic prefix manager 1015 may add, to a beginning of each symbol in the set of symbols, a cyclic prefix including the DMRS sequence in the second portion of the respective symbol. In some examples, the cyclic prefix manager 1015 may determine, at a beginning of each symbol in the set of symbols, a cyclic prefix including the DMRS sequence in the second portion of the respective symbol. In some cases, a length of the cyclic prefix is based on a delay spread of the wireless channel, a timing error requirement associated with the wireless channel, or both.

The burst transmission manager 1020 may transmit the set of symbols, including the cyclic prefix at the beginning of each respective symbol, in a burst over a wireless channel using a single-carrier waveform. In some examples, the burst transmission manager 1020 may transmit a first symbol and a second symbol immediately following the first symbol, where the second portion including the DMRS sequence of the first symbol immediately precedes the cyclic prefix of the second symbol.

The burst reception manager 1030 may receive, over a wireless channel via a single-carrier waveform, a burst including a set of symbols, where each symbol of the set of symbols includes a first portion including data and a second portion including a DMRS sequence, where the second portion of each symbol is positioned at the end of the respective symbol. In some examples, the burst reception manager 1030 may receive a first symbol and a second symbol immediately following the first symbol, where the second portion including the DMRS sequence of the first symbol immediately precedes the cyclic prefix of the second symbol. In some cases, the burst includes a set of sub-bursts, where the at least one symbol includes a sequentially first symbol in each sub-burst. In some cases, the set of sub-bursts include a first sub-burst including a first set of symbols and a second sub-burst including a second set of symbols, where each DMRS sequence within each of the first set of symbols include a first format, and where each DMRS sequence within each of the second set of symbols include a second format different from the first format.

The channel estimation manager 1035 may perform a channel estimation of the wireless channel based on the DMRS sequence. In some examples, the channel estimation manager 1035 may perform a DFT of the DMRS sequence of each symbol of the set of symbols, where performing the channel estimation is based on performing the DFT. In some examples, the channel estimation manager 1035 may perform a DFT of the at least one additional DMRS sequence, where performing the channel estimation is based on performing the DFT.

In some examples, the channel estimation manager 1035 may determine a phase shift between the at least one additional DMRS sequence of the at least one symbol and the DMRS sequence within the second portion of the at least one symbol, where performing the channel estimation is based on determining the phase shift. In some examples, the channel estimation manager 1035 may perform a set of time-domain equalizer taps based on the DMRS sequence of each symbol of the set of symbols, where performing the channel estimation is based on performing the set of time-domain equalizer taps.

The DMRS sequence manager 1025 may add, for at least one symbol of the set of symbols, at least one additional DMRS sequence between the cyclic prefix and the second portion of the at least one symbol. In some examples, the DMRS sequence manager 1025 may add the at least one additional DMRS sequence immediately following the cyclic prefix of the at least one symbol. In some examples, the DMRS sequence manager 1025 may add the at least one additional DMRS sequence immediately preceding the second portion including the DMRS sequence of the at least one symbol. In some cases, the at least one symbol of the set of symbols further includes a sequentially last symbol in each sub-burst of the set of sub-bursts.

In some examples, the DMRS sequence manager 1025 may determine, for at least one symbol of the set of symbols, at least one additional DMRS sequence between the cyclic prefix and the second portion of the at least one symbol. In some examples, the DMRS sequence manager 1025 may determine, for at least one symbol of the set of symbols, at least one additional DMRS sequence between the cyclic prefix and the second portion of the at least one symbol. In some examples, the DMRS sequence manager 1025 may determine the at least one additional DMRS sequence immediately following the cyclic prefix of the at least one symbol. In some examples, the DMRS sequence manager 1025 may determine the at least one additional DMRS sequence immediately preceding the second portion including the DMRS sequence of the at least one symbol.

In some cases, the at least one symbol includes a sequentially first symbol of the burst, a sequentially last symbol of the burst, or both. In some cases, the at least one symbol includes each symbol of the set of symbols. In some cases, the at least one additional DMRS sequence in each symbol of the set of symbols includes a second format different from a first format of the cyclic prefix and the DMRS sequence of the second portion of the respective symbol. In some cases, the DMRS sequence in the second portion of each symbol and the at least one additional DMRS sequence include sub-sequences of a longer DMRS sequence. In some cases, the sub-sequences of the longer DMRS sequence are shifted according to a cyclical shift pattern for each sequential symbol of the set of symbols. In some cases, a first symbol includes a first iteration of the longer DMRS sequence and a second symbol immediately following the first symbol includes a second iteration of the longer DMRS sequence different from the first iteration, where a $(k+1)^{th}$ sub-sequence of the first iteration of the longer DMRS sequence includes a $k^{th}$ sub-sequence of the second iteration of the longer DMRS sequence.

In some cases, each sub-sequence of the longer DMRS sequence include an identical time duration. In some cases, a length of the DMRS sequence, the at least one additional DMRS sequence, or both, is based on a frequency selectivity of the wireless channel. In some cases, each DMRS sequence within the burst is identical. In some cases, a DFT of the DMRS sequence of each symbol of the set of symbols includes a constant modulus sequence. In some cases, the DMRS sequence of each symbol of the set of symbols includes a ZC sequence, a CAZAC sequence, or both. In some cases, the at least one symbol includes a sequentially first symbol of the burst, a sequentially last symbol of the burst, or both. In some cases, the at least one symbol includes each symbol of the set of symbols.

Figure 11:
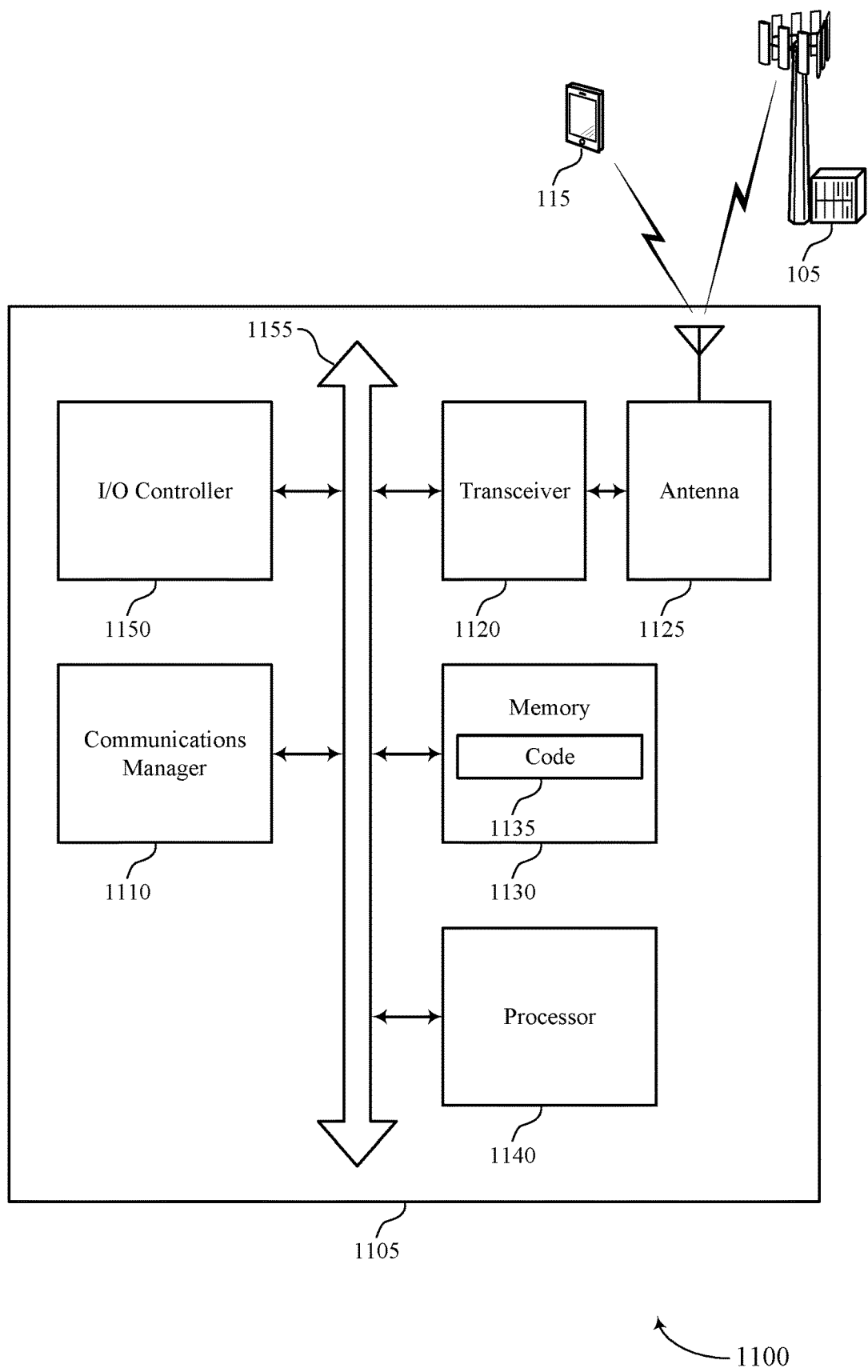
FIG. 11 shows a diagram of a system including a user equipment (UE) that supports time-domain DMRS patterns for single-carrier communication waveform in accordance with aspects of the present disclosure.

FIG. 11 shows a diagram of a system 1100 including a device 1105 that supports time-domain DMRS pattern for single-carrier communication waveform in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, a transceiver 1120, an antenna 1125, memory 1130, a processor 1140, and an I/O controller 1150. These components may be in electronic communication via one or more buses (e.g., bus 1155).

The communications manager 1110 may generate a set of symbols, where each symbol of the set of symbols includes a first portion including data and a second portion including a DMRS sequence, where the second portion of each symbol is positioned at the end of the respective symbol, add, to a beginning of each symbol in the set of symbols, a cyclic prefix including the DMRS sequence in the second portion of the respective symbol, and transmit the set of symbols, including the cyclic prefix at the beginning of each respective symbol, in a burst over a wireless channel using a single-carrier waveform. The communications manager 1110 may also receive, over a wireless channel via a single-carrier waveform, a burst including a set of symbols, where each symbol of the set of symbols includes a first portion including data and a second portion including a DMRS sequence, where the second portion of each symbol is positioned at the end of the respective symbol, determine, at a beginning of each symbol in the set of symbols, a cyclic prefix including the DMRS sequence in the second portion of the respective symbol, and perform a channel estimation of the wireless channel based on the DMRS sequence.

Transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include random-access memory (RAM), read-only memory (ROM), or a combination thereof. The memory 1130 may store computer-readable code 1135 including instructions that, when executed by a processor (e.g., the processor 1140) cause the device to perform various functions described herein. In some cases, the memory 1130 may contain, among other things, a basic I/O system (BIOS) which may control basic hardware or software operation such as the interaction with peripheral components or devices.

The processor 1140 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting time-domain DMRS pattern for single-carrier communication waveform).

The I/O controller 1150 may manage input and output signals for the device 1105. The I/O controller 1150 may also manage peripherals not integrated into the device 1105. In some cases, the I/O controller 1150 may represent a physical connection or port to an external peripheral. In some cases, the I/O controller 1150 may utilize an operating system such as iOS®, ANDROID®, MS-DOS®, MS-WINDOWS®, OS/2®, UNIX®, LINUX®, or another known operating system. In other cases, the I/O controller 1150 may represent or interact with a modem, a keyboard, a mouse, a touchscreen, or a similar device. In some cases, the I/O controller 1150 may be implemented as part of a processor. In some cases, a user may interact with the device 1105 via the I/O controller 1150 or via hardware components controlled by the I/O controller 1150.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
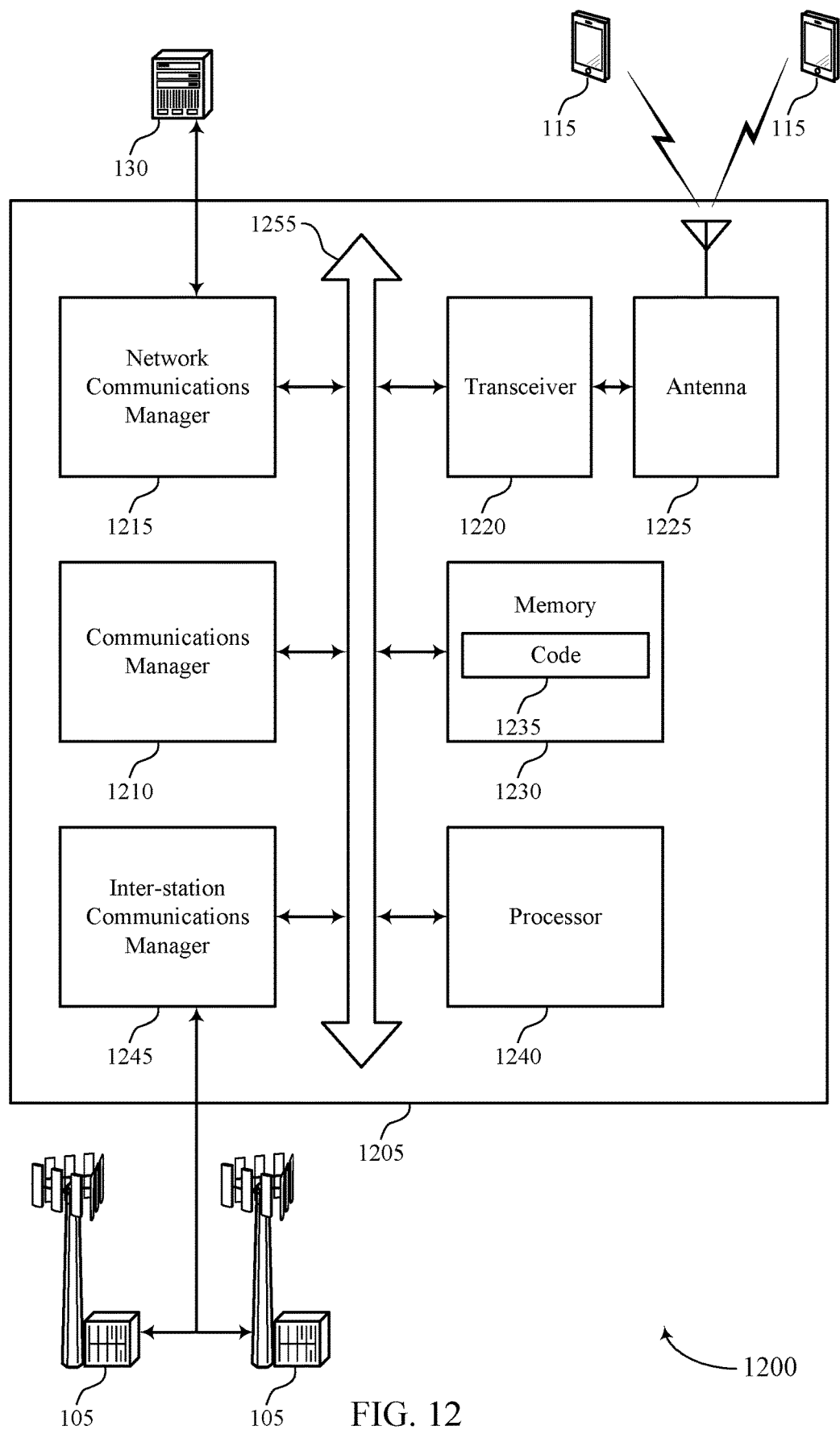
FIG. 12 shows a diagram of a system including a base station that supports time-domain DMRS patterns for single-carrier communication waveform in accordance with aspects of the present disclosure.

FIG. 12 shows a diagram of a system 1200 including a device 1205 that supports time-domain DMRS pattern for single-carrier communication waveform in accordance with aspects of the present disclosure. The device 1205 may be an example of or include the components of device 805, device 905, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1255).

The communications manager 1210 may generate a set of symbols, where each symbol of the set of symbols includes a first portion including data and a second portion including a DMRS sequence, where the second portion of each symbol is positioned at the end of the respective symbol, add, to a beginning of each symbol in the set of symbols, a cyclic prefix including the DMRS sequence in the second portion of the respective symbol, and transmit the set of symbols, including the cyclic prefix at the beginning of each respective symbol, in a burst over a wireless channel using a single-carrier waveform. The communications manager 1210 may also receive, over a wireless channel via a single-carrier waveform, a burst including a set of symbols, where each symbol of the set of symbols includes a first portion including data and a second portion including a DMRS sequence, where the second portion of each symbol is positioned at the end of the respective symbol, determine, at a beginning of each symbol in the set of symbols, a cyclic prefix including the DMRS sequence in the second portion of the respective symbol, and perform a channel estimation of the wireless channel based on the DMRS sequence.

Network communications manager 1215 may manage communications with the core network (e.g., via one or more wired backhaul links). For example, the network communications manager 1215 may manage the transfer of data communications for client devices, such as one or more UEs 115.

Transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting time-domain DMRS pattern for single-carrier communication waveform).

Inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

The actions performed by the communications manager 1210 as described herein may be implemented to realize one or more potential advantages. For example, enabling time-domain DMRS patterns for single-carrier waveforms may lead to more efficient use of time and frequency resources, and may enable single-carrier waveforms to be received and decoded by both frequency-domain receivers and time-domain receivers. Moreover, the time-domain DMRS patterns for single-carrier waveforms may improve wireless communications particularity within high frequency bands, thereby improving the efficiency and reliability of the wireless communications. Such improvements in wireless communications may thereby reduce a quantity of retransmissions which must be performed, reduce power consumption at the UE 115 and/or base station 105, alleviate network overhead, and provide an improved user experience.

Figure 13:
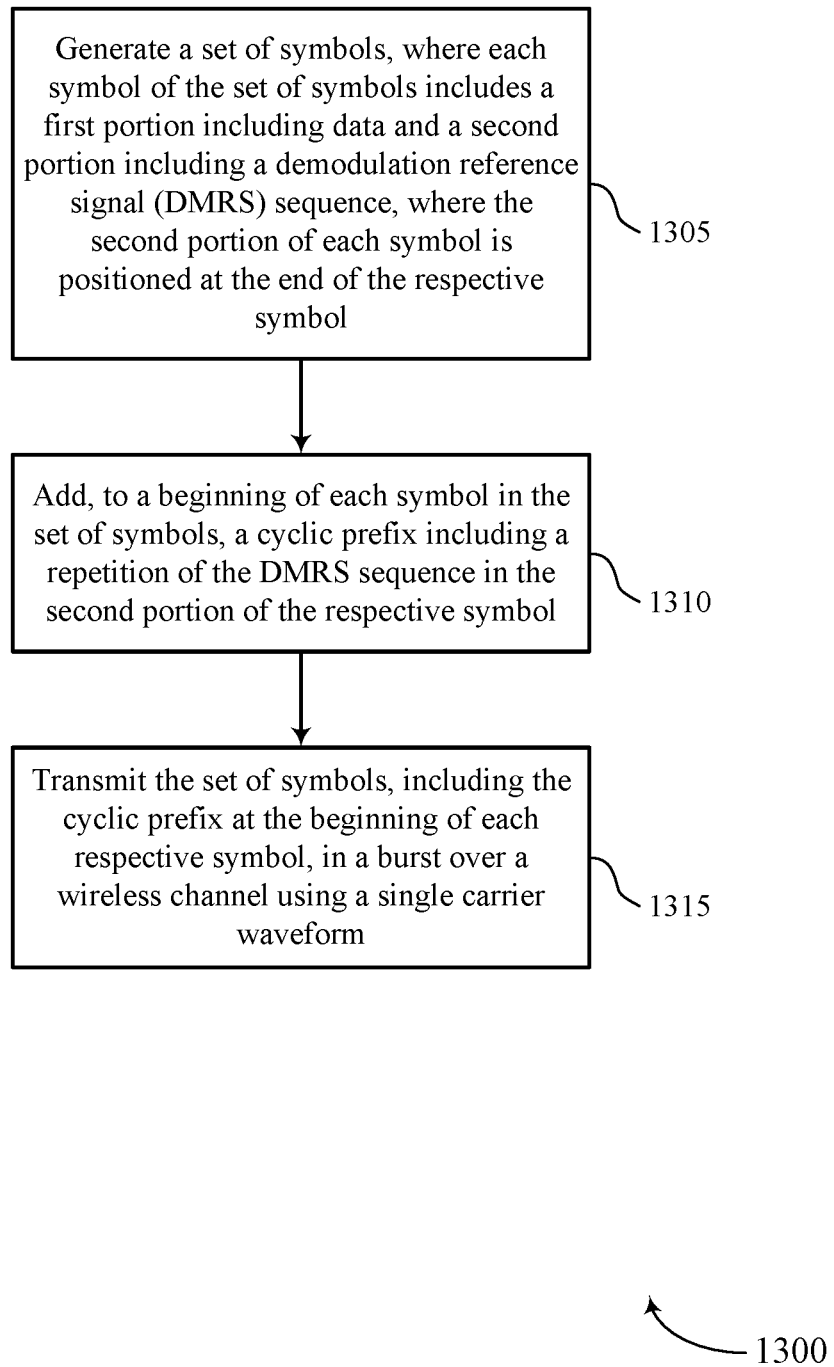
FIGS. 13 through 17 show flowcharts illustrating methods that support time-domain DMRS patterns for single-carrier communication waveform in accordance with aspects of the present disclosure.

FIG. 13 shows a flowchart illustrating a method 1300 that supports time-domain DMRS pattern for single-carrier communication waveform in accordance with aspects of the present disclosure. The operations of method 1300 may be implemented by a UE 115 or base station 105 or its components as described herein. For example, the operations of method 1300 may be performed by a communications manager as described with reference to FIGS. 8 through 12. In some examples, a UE or base station may execute a set of instructions to control the functional elements of the UE or base station to perform the functions described below. Additionally or alternatively, a UE or base station may perform aspects of the functions described below using special-purpose hardware.

At 1305, the UE or base station may generate a set of symbols, where each symbol of the set of symbols includes a first portion including data and a second portion including a DMRS sequence, where the second portion of each symbol is positioned at the end of the respective symbol. The operations of 1305 may be performed according to the methods described herein. In some examples, aspects of the operations of 1305 may be performed by a symbol generation manager as described with reference to FIGS. 8 through 12.

At 1310, the UE or base station may add, to a beginning of each symbol in the set of symbols, a cyclic prefix including the DMRS sequence in the second portion of the respective symbol. The operations of 1310 may be performed according to the methods described herein. In some examples, aspects of the operations of 1310 may be performed by a cyclic prefix manager as described with reference to FIGS. 8 through 12.

At 1315, the UE or base station may transmit the set of symbols, including the cyclic prefix at the beginning of each respective symbol, in a burst over a wireless channel using a single-carrier waveform. The operations of 1315 may be performed according to the methods described herein. In some examples, aspects of the operations of 1315 may be performed by a burst transmission manager as described with reference to FIGS. 8 through 12.

Figure 14:
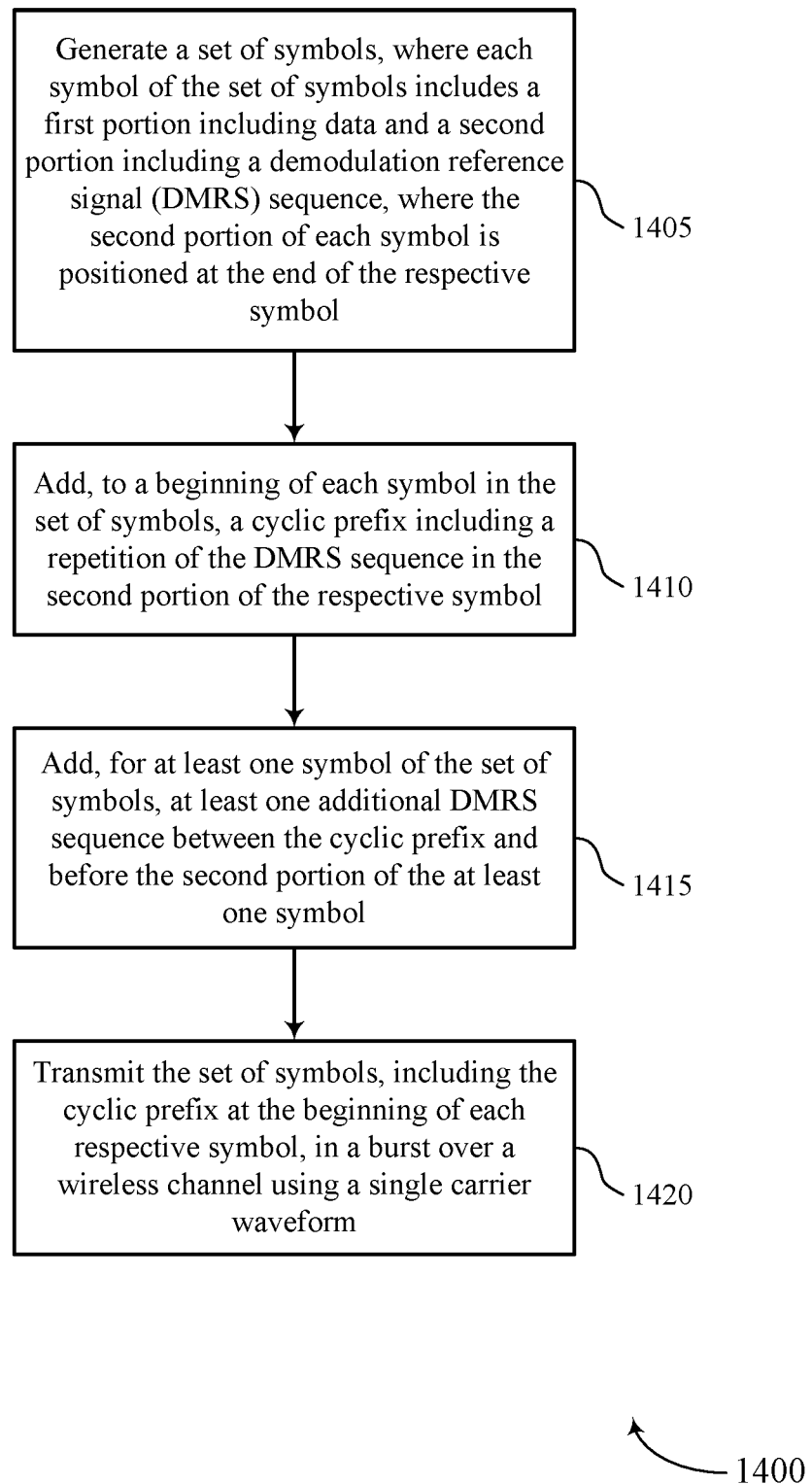

FIG. 14 shows a flowchart illustrating a method 1400 that supports time-domain DMRS pattern for single-carrier communication waveform in accordance with aspects of the present disclosure. The operations of method 1400 may be implemented by a UE 115 or base station 105 or its components as described herein. For example, the operations of method 1400 may be performed by a communications manager as described with reference to FIGS. 8 through 12. In some examples, a UE or base station may execute a set of instructions to control the functional elements of the UE or base station to perform the functions described below. Additionally or alternatively, a UE or base station may perform aspects of the functions described below using special-purpose hardware.

At 1405, the UE or base station may generate a set of symbols, where each symbol of the set of symbols includes a first portion including data and a second portion including a DMRS sequence, where the second portion of each symbol is positioned at the end of the respective symbol. The operations of 1405 may be performed according to the methods described herein. In some examples, aspects of the operations of 1405 may be performed by a symbol generation manager as described with reference to FIGS. 8 through 12.

At 1410, the UE or base station may add, to a beginning of each symbol in the set of symbols, a cyclic prefix including the DMRS sequence in the second portion of the respective symbol. The operations of 1410 may be performed according to the methods described herein. In some examples, aspects of the operations of 1410 may be performed by a cyclic prefix manager as described with reference to FIGS. 8 through 12.

At 1415, the UE or base station may add, for at least one symbol of the set of symbols, at least one additional DMRS sequence between the cyclic prefix and the second portion of the at least one symbol. The operations of 1415 may be performed according to the methods described herein. In some examples, aspects of the operations of 1415 may be performed by a DMRS sequence manager as described with reference to FIGS. 8 through 12.

At 1420, the UE or base station may transmit the set of symbols, including the cyclic prefix at the beginning of each respective symbol, in a burst over a wireless channel using a single-carrier waveform. The operations of 1420 may be performed according to the methods described herein. In some examples, aspects of the operations of 1420 may be performed by a burst transmission manager as described with reference to FIGS. 8 through 12.

Figure 15:
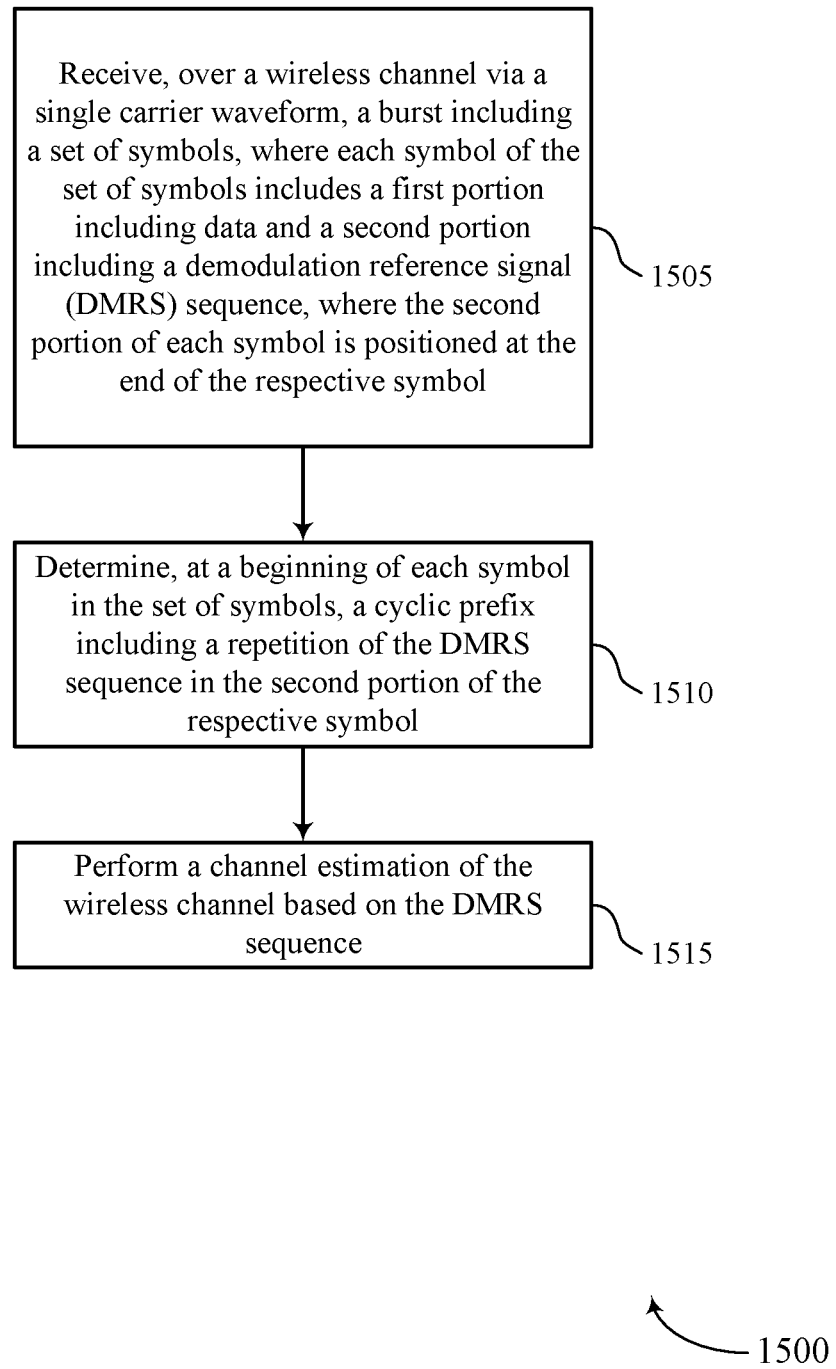

FIG. 15 shows a flowchart illustrating a method 1500 that supports time-domain DMRS pattern for single-carrier communication waveform in accordance with aspects of the present disclosure. The operations of method 1500 may be implemented by a UE 115 or base station 105 or its components as described herein. For example, the operations of method 1500 may be performed by a communications manager as described with reference to FIGS. 8 through 12. In some examples, a UE or base station may execute a set of instructions to control the functional elements of the UE or base station to perform the functions described below. Additionally or alternatively, a UE or base station may perform aspects of the functions described below using special-purpose hardware.

At 1505, the UE or base station may receive, over a wireless channel via a single-carrier waveform, a burst including a set of symbols, where each symbol of the set of symbols includes a first portion including data and a second portion including a DMRS sequence, where the second portion of each symbol is positioned at the end of the respective symbol. The operations of 1505 may be performed according to the methods described herein. In some examples, aspects of the operations of 1505 may be performed by a burst reception manager as described with reference to FIGS. 8 through 12.

At 1510, the UE or base station may determine, at a beginning of each symbol in the set of symbols, a cyclic prefix including the DMRS sequence in the second portion of the respective symbol. The operations of 1510 may be performed according to the methods described herein. In some examples, aspects of the operations of 1510 may be performed by a cyclic prefix manager as described with reference to FIGS. 8 through 12.

At 1515, the UE or base station may perform a channel estimation of the wireless channel based on the DMRS sequence. The operations of 1515 may be performed according to the methods described herein. In some examples, aspects of the operations of 1515 may be performed by a channel estimation manager as described with reference to FIGS. 8 through 12.

Figure 16:
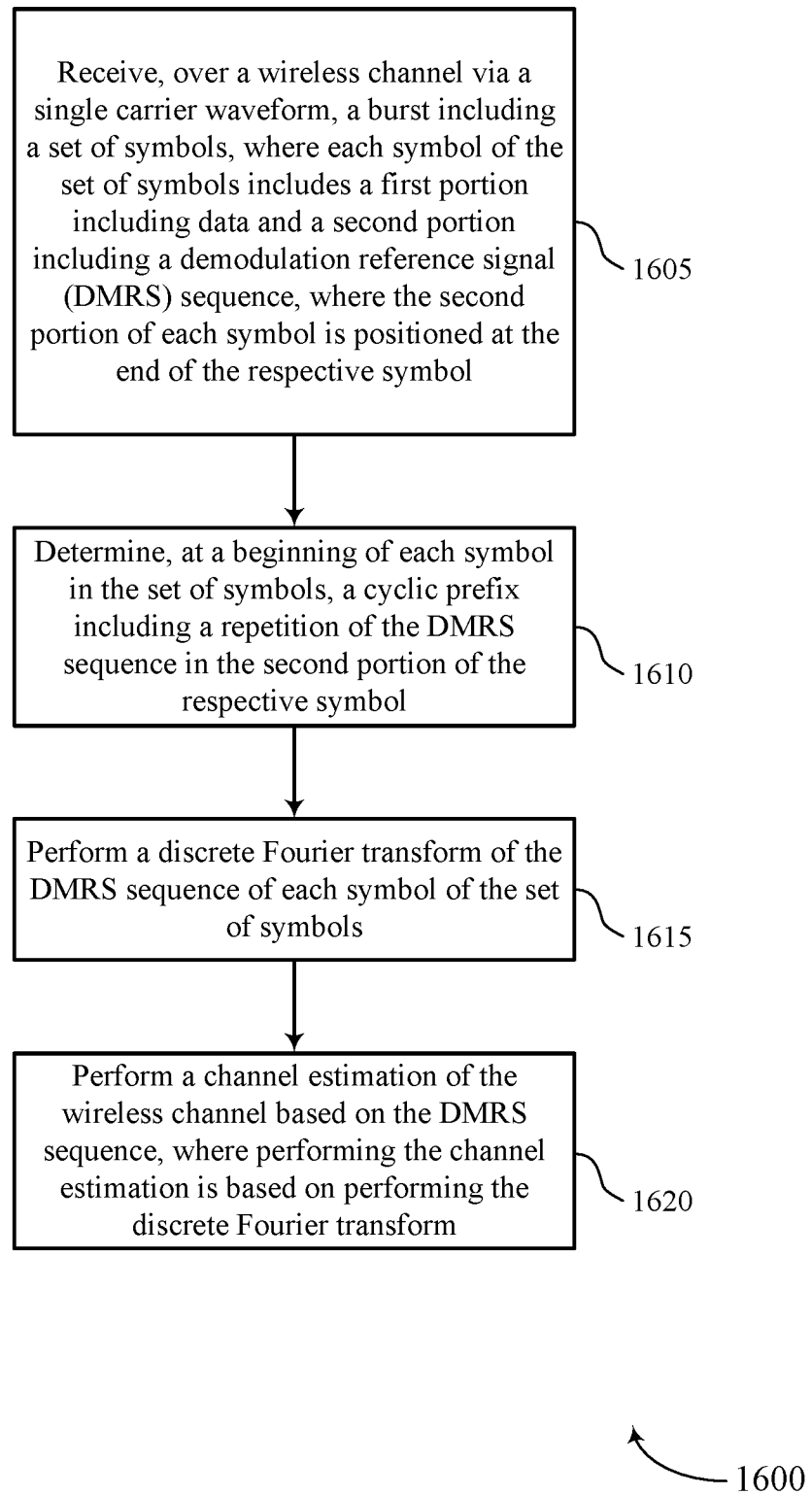

FIG. 16 shows a flowchart illustrating a method 1600 that supports time-domain DMRS pattern for single-carrier communication waveform in accordance with aspects of the present disclosure. The operations of method 1600 may be implemented by a UE 115 or base station 105 or its components as described herein. For example, the operations of method 1600 may be performed by a communications manager as described with reference to FIGS. 8 through 12. In some examples, a UE or base station may execute a set of instructions to control the functional elements of the UE or base station to perform the functions described below. Additionally or alternatively, a UE or base station may perform aspects of the functions described below using special-purpose hardware.

At 1605, the UE or base station may receive, over a wireless channel via a single-carrier waveform, a burst including a set of symbols, where each symbol of the set of symbols includes a first portion including data and a second portion including a DMRS sequence, where the second portion of each symbol is positioned at the end of the respective symbol. The operations of 1605 may be performed according to the methods described herein. In some examples, aspects of the operations of 1605 may be performed by a burst reception manager as described with reference to FIGS. 8 through 12.

At 1610, the UE or base station may determine, at a beginning of each symbol in the set of symbols, a cyclic prefix including the DMRS sequence in the second portion of the respective symbol. The operations of 1610 may be performed according to the methods described herein. In some examples, aspects of the operations of 1610 may be performed by a cyclic prefix manager as described with reference to FIGS. 8 through 12.

At 1615, the UE or base station may perform a DFT of the DMRS sequence of each symbol of the set of symbols. The operations of 1615 may be performed according to the methods described herein. In some examples, aspects of the operations of 1615 may be performed by a channel estimation manager as described with reference to FIGS. 8 through 12.

At 1620, the UE or base station may perform a channel estimation of the wireless channel based on the DMRS sequence, where performing the channel estimation is based on performing the DFT. The operations of 1620 may be performed according to the methods described herein. In some examples, aspects of the operations of 1620 may be performed by a channel estimation manager as described with reference to FIGS. 8 through 12.

Figure 17:
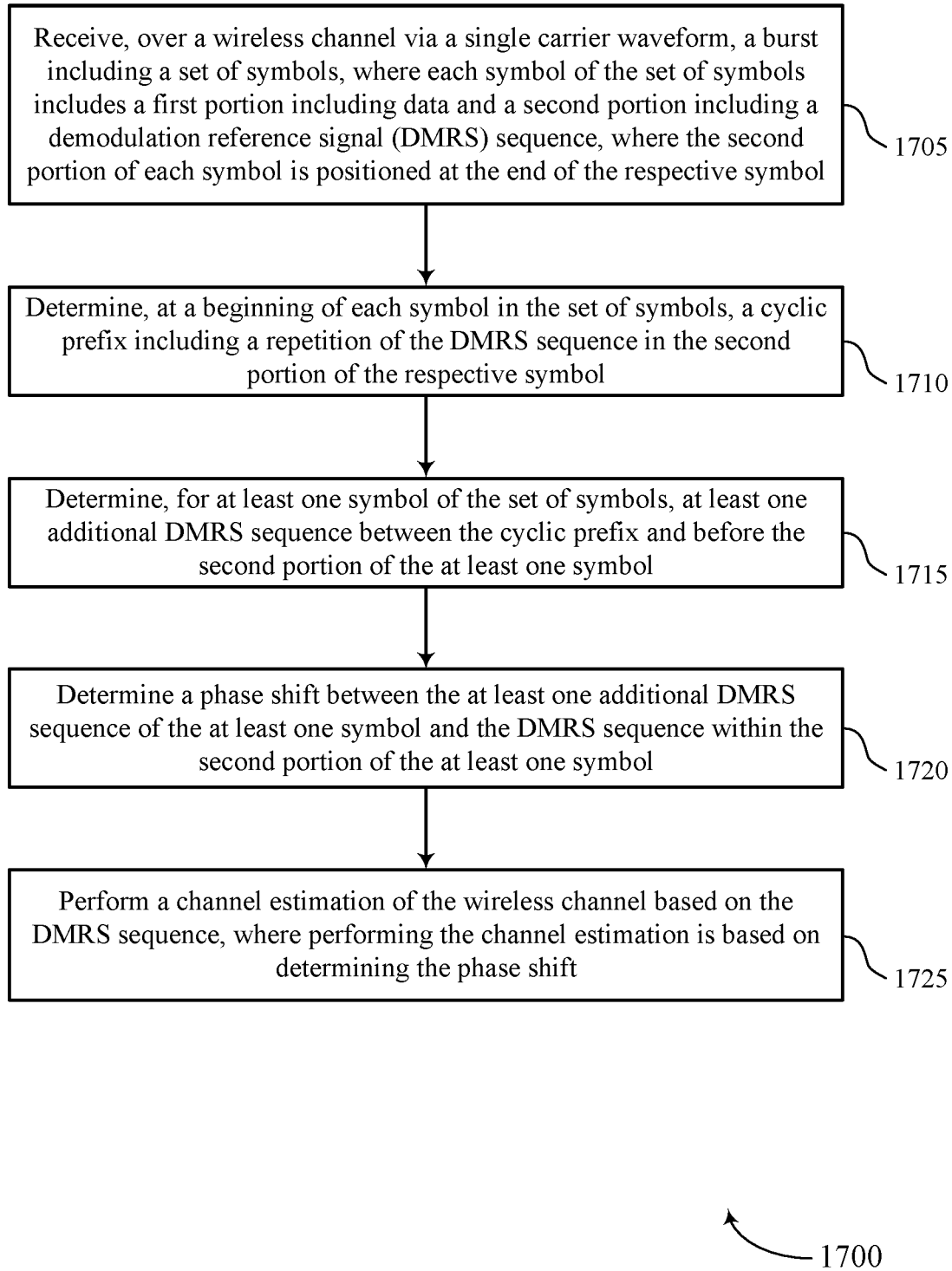

FIG. 17 shows a flowchart illustrating a method 1700 that supports time-domain DMRS pattern for single-carrier communication waveform in accordance with aspects of the present disclosure. The operations of method 1700 may be implemented by a UE 115 or base station 105 or its components as described herein. For example, the operations of method 1700 may be performed by a communications manager as described with reference to FIGS. 8 through 12. In some examples, a UE or base station may execute a set of instructions to control the functional elements of the UE or base station to perform the functions described below. Additionally or alternatively, a UE or base station may perform aspects of the functions described below using special-purpose hardware.

At 1705, the UE or base station may receive, over a wireless channel via a single-carrier waveform, a burst including a set of symbols, where each symbol of the set of symbols includes a first portion including data and a second portion including a DMRS sequence, where the second portion of each symbol is positioned at the end of the respective symbol. The operations of 1705 may be performed according to the methods described herein. In some examples, aspects of the operations of 1705 may be performed by a burst reception manager as described with reference to FIGS. 8 through 12.

At 1710, the UE or base station may determine, at a beginning of each symbol in the set of symbols, a cyclic prefix including the DMRS sequence in the second portion of the respective symbol. The operations of 1710 may be performed according to the methods described herein. In some examples, aspects of the operations of 1710 may be performed by a cyclic prefix manager as described with reference to FIGS. 8 through 12.

At 1715, the UE or base station may determine, for at least one symbol of the set of symbols, at least one additional DMRS sequence between the cyclic prefix and the second portion of the at least one symbol. The operations of 1715 may be performed according to the methods described herein. In some examples, aspects of the operations of 1715 may be performed by a DMRS sequence manager as described with reference to FIGS. 8 through 12.

At 1720, the UE or base station may determine a phase shift between the at least one additional DMRS sequence of the at least one symbol and the DMRS sequence within the second portion of the at least one symbol. The operations of 1720 may be performed according to the methods described herein. In some examples, aspects of the operations of 1720 may be performed by a channel estimation manager as described with reference to FIGS. 8 through 12.

At 1725, the UE or base station may perform a channel estimation of the wireless channel based on the DMRS sequence, where performing the channel estimation is based on determining the phase shift. The operations of 1725 may be performed according to the methods described herein. In some examples, aspects of the operations of 1725 may be performed by a channel estimation manager as described with reference to FIGS. 8 through 12.

The following provides an overview of aspects of the present disclosure:

Aspect 1: A method for wireless communication at a wireless device, comprising: generating a plurality of symbols, wherein each symbol of the plurality of symbols comprises a first portion comprising data and a second portion comprising a DMRS sequence, wherein the second portion of each symbol is positioned at the end of the respective symbol; adding, to a beginning of each symbol in the plurality of symbols, a cyclic prefix comprising a repetition of the DMRS sequence in the second portion of the respective symbol; and transmitting the plurality of symbols, including the cyclic prefix at the beginning of each respective symbol, in a burst over a wireless channel using a single-carrier waveform.

Aspect 2: The method of aspect 1, further comprising: adding, for at least one symbol of the plurality of symbols, at least one additional DMRS sequence between the cyclic prefix and the second portion of the at least one symbol.

Aspect 3: The method of aspect 2, wherein adding the at least one additional DMRS sequence comprises: adding the at least one additional DMRS sequence immediately following the cyclic prefix of the at least one symbol, or immediately preceding the second portion comprising the DMRS sequence of the at least one symbol, or any combination thereof.

Aspect 4: The method of any of aspects 2 through 3, wherein the at least one additional DMRS sequence comprises a repetition of at least a portion of the DMRS sequence of the second portion of the respective symbol.

Aspect 5: The method of any of aspects 2 through 4, wherein the at least one symbol comprises a sequentially first symbol of the burst, a sequentially last symbol of the burst, or both.

Aspect 6: The method of any of aspects 2 through 5, wherein the burst comprises a plurality of sub-bursts, the at least one symbol comprises a sequentially first symbol in each sub-burst, a sequentially last symbol in each sub-burst, or both, and the plurality of sub-bursts comprise a first sub-burst comprising a first set of symbols and a second sub-burst comprising a second set of symbols, each DMRS sequence within each of the first set of symbols comprise a first format, and each DMRS sequence within each of the second set of symbols comprise a second format different from the first format.

Aspect 7: The method of any of aspects 2 through 6, wherein the at least one symbol comprises each symbol of the plurality of symbol, and the at least one additional DMRS sequence in each symbol of the plurality of symbols comprises a second format different from a first format of the cyclic prefix and the DMRS sequence of the second portion of the respective symbol.

Aspect 8: The method of any of aspects 2 through 7, wherein the at least one symbol comprises each symbol of the plurality of symbol, and the DMRS sequence in the second portion of each symbol and the at least one additional DMRS sequence comprise sub-sequences of a longer DMRS sequence; the sub-sequences of the longer DMRS sequence are shifted according to a cyclical shift pattern for each sequential symbol of the plurality of symbols; a first symbol comprises a first iteration of the longer DMRS sequence and a second symbol immediately following the first symbol comprises a second iteration of the longer DMRS sequence different from the first iteration, wherein a $[(k+1)]$^th sub-sequence of the first iteration of the longer DMRS sequence comprises a $k$^th sub-sequence of the second iteration of the longer DMRS sequence; and each sub-sequence of the longer DMRS sequence comprise an identical time duration.

Aspect 9: The method of any of aspects 2 through 8, wherein a length of the DMRS sequence, the at least one additional DMRS sequence, or both, is based at least in part on a frequency selectivity of the wireless channel; a length of the cyclic prefix is based at least in part on a delay spread of the wireless channel, a timing error requirement associated with the wireless channel, or both; or any combination thereof.

Aspect 10: The method of any of aspects 1 through 9, wherein each DMRS sequence within the burst is identical.

Aspect 11: The method of any of aspects 1 through 10, wherein a discrete Fourier transform of the DMRS sequence of each symbol of the plurality of symbols comprises a constant modulus sequence; the DMRS sequence of each symbol of the plurality of symbols comprises a Zadoff-Chu sequence, a Constant Amplitude Zero Auto-Correlation sequence, or both; or any combination thereof.

Aspect 12: A method for wireless communication at a wireless device, comprising: receiving, over a wireless channel via a single-carrier waveform, a burst comprising a plurality of symbols, wherein each symbol of the plurality of symbols comprises a first portion comprising data and a second portion comprising a DMRS sequence, wherein the second portion of each symbol is positioned at the end of the respective symbol; identifying, at a beginning of each symbol in the plurality of symbols, a cyclic prefix comprising a repetition of the DMRS sequence in the second portion of the respective symbol; and performing a channel estimation of the wireless channel based at least in part on the DMRS sequence.

Aspect 13: The method of aspect 12, further comprising: performing a discrete Fourier transform of the DMRS sequence of each symbol of the plurality of symbols, wherein performing the channel estimation is based at least in part on performing the discrete Fourier transform.

Aspect 14: The method of any of aspects 12 through 13, further comprising: determining, for at least one symbol of the plurality of symbols, at least one additional DMRS sequence between the cyclic prefix and the second portion of the at least one symbol; and performing a discrete Fourier transform of the at least one additional DMRS sequence, wherein performing the channel estimation is based at least in part on performing the discrete Fourier transform.

Aspect 15: The method of any of aspects 12 through 14, further comprising: determining, for at least one symbol of the plurality of symbols, at least one additional DMRS sequence between the cyclic prefix and the second portion of the at least one symbol; and determining a phase shift between the at least one additional DMRS sequence of the at least one symbol and the DMRS sequence within the second portion of the at least one symbol, wherein performing the channel estimation is based at least in part on determining the phase shift.

Aspect 16: The method of any of aspects 12 through 15, further comprising: performing a set of time-domain equalizer taps based at least in part on the DMRS sequence of each symbol of the plurality of symbols, wherein performing the channel estimation is based at least in part on performing the set of time-domain equalizer taps.

Aspect 17: The method of any of aspects 12 through 16, further comprising: determining, for at least one symbol of the plurality of symbols, at least one additional DMRS sequence between the cyclic prefix and the second portion of the at least one symbol.

Aspect 18: The method of aspect 17, wherein determining the at least one additional DMRS sequence comprises: determining the at least one additional DMRS sequence immediately following the cyclic prefix of the at least one symbol, or immediately preceding the second portion comprising the DMRS sequence of the at least one symbol, or any combination thereof.

Aspect 19: The method of any of aspects 17 through 18, wherein the at least one additional DMRS sequence comprises a repetition of at least a portion of the DMRS sequence of the second portion of the respective symbol.

Aspect 20: The method of any of aspects 17 through 19, wherein the at least one symbol comprises a sequentially first symbol of the burst, a sequentially last symbol of the burst, or both.

Aspect 21: The method of any of aspects 17 through 20, wherein the burst comprises a plurality of sub-bursts, the at least one symbol comprises a sequentially first symbol in each sub-burst, a sequentially last symbol in each sub-burst, or both, and the plurality of sub-bursts comprise a first sub-burst comprising a first set of symbols and a second sub-burst comprising a second set of symbols, each DMRS sequence within each of the first set of symbols comprise a first format, and each DMRS sequence within each of the second set of symbols comprise a second format different from the first format.

Aspect 22: The method of any of aspects 17 through 21, wherein the at least one symbol comprises each symbol of the plurality of symbols, and the at least one additional DMRS sequence in each symbol of the plurality of symbols comprises a second format different from a first format of the cyclic prefix and the DMRS sequence of the second portion of the respective symbol.

Aspect 23: The method of any of aspects 17 through 22, wherein the at least one symbol comprises each symbol of the plurality of symbols, and the DMRS sequence in the second portion of each symbol and the at least one additional DMRS sequence comprise sub-sequences of a longer DMRS sequence; the sub-sequences of the longer DMRS sequence are shifted according to a cyclical shift pattern for each sequential symbol of the plurality of symbols; a first symbol comprises a first iteration of the longer DMRS sequence and a second symbol immediately following the first symbol comprises a second iteration of the longer DMRS sequence different from the first iteration, wherein a $[(k+1)]$^th sub-sequence of the first iteration of the longer DMRS sequence comprises a $k$^th sub-sequence of the second iteration of the longer DMRS sequence; and each sub-sequence of the longer DMRS sequence comprise an identical time duration.

Aspect 24: The method of any of aspects 17 through 23, wherein a length of the DMRS sequence, the at least one additional DMRS sequence, or both, is based at least in part on a frequency selectivity of the wireless channel; a length of the cyclic prefix is based at least in part on a delay spread of the wireless channel, a timing error requirement associated with the wireless channel, or both; or any combination thereof; or any combination thereof.

Aspect 25: The method of any of aspects 12 through 24, wherein each DMRS sequence within the burst is identical.

Aspect 26: The method of any of aspects 12 through 25, wherein receiving the burst comprising the plurality of symbols comprises: receiving a first symbol and a second symbol immediately following the first symbol, wherein the second portion comprising the DMRS sequence of the first symbol immediately precedes the cyclic prefix of the second symbol.

Aspect 27: The method of any of aspects 12 through 26, wherein a discrete Fourier transform of the DMRS sequence of each symbol of the plurality of symbols comprises a constant modulus sequence; the DMRS sequence of each symbol of the plurality of symbols comprises a Zadoff-Chu sequence, a Constant Amplitude Zero Auto-Correlation sequence, or both; or any combination thereof.

Aspect 28: An apparatus for wireless communication at a wireless device, comprising a processor; memory coupled with the processor; and instructions stored in the memory and executable by the processor to cause the apparatus to perform a method of any of aspects 1 through 11.

Aspect 29: An apparatus for wireless communication at a wireless device, comprising at least one means for performing a method of any of aspects 1 through 11.

Aspect 30: A non-transitory computer-readable medium storing code for wireless communication at a wireless device, the code comprising instructions executable by a processor to perform a method of any of aspects 1 through 11.

Aspect 31: An apparatus for wireless communication at a wireless device, comprising a processor; memory coupled with the processor; and instructions stored in the memory and executable by the processor to cause the apparatus to perform a method of any of aspects 12 through 27.

Aspect 32: An apparatus for wireless communication at a wireless device, comprising at least one means for performing a method of any of aspects 12 through 27.

Aspect 33: A non-transitory computer-readable medium storing code for wireless communication at a wireless device, the code comprising instructions executable by a processor to perform a method of any of aspects 12 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a wireless device, comprising:
generating a plurality of symbols, wherein each symbol of the plurality of symbols comprises a first portion comprising data and a second portion comprising a demodulation reference signal (DMRS) sequence, wherein the second portion of each symbol is positioned at the end of the respective symbol;
adding, to a beginning of each symbol in the plurality of symbols, a cyclic prefix comprising a repetition of the DMRS sequence in the second portion of the respective symbol; and
transmitting the plurality of symbols, including the cyclic prefix at the beginning of each respective symbol, in a burst over a wireless channel using a single-carrier waveform.

2. The method of claim 1, further comprising:
adding, for at least one symbol of the plurality of symbols, at least one additional DMRS sequence between the cyclic prefix and the second portion of the at least one symbol.

3. The method of claim 2, wherein adding the at least one additional DMRS sequence comprises:
adding the at least one additional DMRS sequence immediately following the cyclic prefix of the at least one symbol, or immediately preceding the second portion comprising the DMRS sequence of the at least one symbol, or any combination thereof.

4. The method of claim 2, wherein the at least one additional DMRS sequence comprises a repetition of at least a portion of the DMRS sequence of the second portion of the respective symbol.

5. The method of claim 2, wherein the at least one symbol comprises a sequentially first symbol of the burst, a sequentially last symbol of the burst, or both.

6. The method of claim 2, wherein the burst comprises a plurality of sub-bursts, wherein the at least one symbol comprises a sequentially first symbol in each sub-burst, a sequentially last symbol in each sub-burst, or both, and wherein the plurality of sub-bursts comprise a first sub-burst comprising a first set of symbols and a second sub-burst comprising a second set of symbols, wherein each DMRS sequence within each of the first set of symbols comprise a first format, and wherein each DMRS sequence within each of the second set of symbols comprise a second format different from the first format.

7. The method of claim 2, wherein the at least one symbol comprises each symbol of the plurality of symbol, and the at least one additional DMRS sequence in each symbol of the plurality of symbols comprises a second format different from a first format of the cyclic prefix and the DMRS sequence of the second portion of the respective symbol.

8. The method of claim 2, wherein:
the at least one symbol comprises each symbol of the plurality of symbol, and the DMRS sequence in the second portion of each symbol and the at least one additional DMRS sequence comprise sub-sequences of a longer DMRS sequence;
the sub-sequences of the longer DMRS sequence are shifted according to a cyclical shift pattern for each sequential symbol of the plurality of symbols;
a first symbol comprises a first iteration of the longer DMRS sequence and a second symbol immediately following the first symbol comprises a second iteration of the longer DMRS sequence different from the first iteration, wherein a $(k+1)^{th}$ sub-sequence of the first iteration of the longer DMRS sequence comprises a $k^{th}$ sub-sequence of the second iteration of the longer DMRS sequence; and
each sub-sequence of the longer DMRS sequence comprise an identical time duration.

9. The method of claim 2, wherein:
a length of the DMRS sequence, the at least one additional DMRS sequence, or both, is based at least in part on a frequency selectivity of the wireless channel;
a length of the cyclic prefix is based at least in part on a delay spread of the wireless channel, a timing error requirement associated with the wireless channel, or both; or
any combination thereof.

10. The method of claim 1, wherein each DMRS sequence within the burst is identical.

11. The method of claim 1, wherein:
a discrete Fourier transform of the DMRS sequence of each symbol of the plurality of symbols comprises a constant modulus sequence;
the DMRS sequence of each symbol of the plurality of symbols comprises a Zadoff-Chu sequence, a Constant Amplitude Zero Auto-Correlation sequence, or both; or any combination thereof.

12. A method for wireless communication at a wireless device, comprising:
receiving, over a wireless channel via a single-carrier waveform, a burst comprising a plurality of symbols, wherein each symbol of the plurality of symbols comprises a first portion comprising data and a second portion comprising a demodulation reference signal (DMRS) sequence, wherein the second portion of each symbol is positioned at the end of the respective symbol;
identifying, at a beginning of each symbol in the plurality of symbols, a cyclic prefix comprising a repetition of the DMRS sequence in the second portion of the respective symbol; and
performing a channel estimation of the wireless channel based at least in part on the DMRS sequence.

13. The method of claim 12, further comprising:
performing a discrete Fourier transform of the DMRS sequence of each symbol of the plurality of symbols, wherein performing the channel estimation is based at least in part on performing the discrete Fourier transform.

14. The method of claim 12, further comprising:
determining, for at least one symbol of the plurality of symbols, at least one additional DMRS sequence between the cyclic prefix and the second portion of the at least one symbol; and
performing a discrete Fourier transform of the at least one additional DMRS sequence, wherein performing the channel estimation is based at least in part on performing the discrete Fourier transform.

15. The method of claim 12, further comprising:
determining, for at least one symbol of the plurality of symbols, at least one additional DMRS sequence between the cyclic prefix and the second portion of the at least one symbol; and
determining a phase shift between the at least one additional DMRS sequence of the at least one symbol and the DMRS sequence within the second portion of the at least one symbol, wherein performing the channel estimation is based at least in part on determining the phase shift.

16. The method of claim 12, further comprising:
performing a set of time-domain equalizer taps based at least in part on the DMRS sequence of each symbol of the plurality of symbols, wherein performing the channel estimation is based at least in part on performing the set of time-domain equalizer taps.

17. The method of claim 12, further comprising:
determining, for at least one symbol of the plurality of symbols, at least one additional DMRS sequence between the cyclic prefix and the second portion of the at least one symbol.

18. The method of claim 17, wherein determining the at least one additional DMRS sequence comprises:
determining the at least one additional DMRS sequence immediately following the cyclic prefix of the at least one symbol, or immediately preceding the second portion comprising the DMRS sequence of the at least one symbol, or any combination thereof.

19. The method of claim 17, wherein the at least one additional DMRS sequence comprises a repetition of at least a portion of the DMRS sequence of the second portion of the respective symbol.

20. The method of claim 17, wherein the at least one symbol comprises a sequentially first symbol of the burst, a sequentially last symbol of the burst, or both.

21. The method of claim 17, wherein the burst comprises a plurality of sub-bursts, wherein the at least one symbol comprises a sequentially first symbol in each sub-burst, a sequentially last symbol in each sub-burst, or both, and wherein the plurality of sub-bursts comprise a first sub-burst comprising a first set of symbols and a second sub-burst comprising a second set of symbols, wherein each DMRS sequence within each of the first set of symbols comprise a first format, and wherein each DMRS sequence within each of the second set of symbols comprise a second format different from the first format.

22. The method of claim 17, wherein the at least one symbol comprises each symbol of the plurality of symbols, and the at least one additional DMRS sequence in each symbol of the plurality of symbols comprises a second format different from a first format of the cyclic prefix and the DMRS sequence of the second portion of the respective symbol.

23. The method of claim 17, wherein:
the at least one symbol comprises each symbol of the plurality of symbols, and the DMRS sequence in the second portion of each symbol and the at least one additional DMRS sequence comprise sub-sequences of a longer DMRS sequence;
the sub-sequences of the longer DMRS sequence are shifted according to a cyclical shift pattern for each sequential symbol of the plurality of symbols;
a first symbol comprises a first iteration of the longer DMRS sequence and a second symbol immediately following the first symbol comprises a second iteration of the longer DMRS sequence different from the first iteration, wherein a $(k+1)^{th}$ sub-sequence of the first iteration of the longer DMRS sequence comprises a $k^{th}$ sub-sequence of the second iteration of the longer DMRS sequence; and
each sub-sequence of the longer DMRS sequence comprise an identical time duration.

24. The method of claim 17, wherein:
a length of the DMRS sequence, the at least one additional DMRS sequence, or both, is based at least in part on a frequency selectivity of the wireless channel;
a length of the cyclic prefix is based at least in part on a delay spread of the wireless channel, a timing error requirement associated with the wireless channel, or both; or any combination thereof; or
any combination thereof.

25. The method of claim 12, wherein each DMRS sequence within the burst is identical.

26. The method of claim 12, wherein receiving the burst comprising the plurality of symbols comprises:
receiving a first symbol and a second symbol immediately following the first symbol, wherein the second portion comprising the DMRS sequence of the first symbol immediately precedes the cyclic prefix of the second symbol.

27. The method of claim 12, wherein:
a discrete Fourier transform of the DMRS sequence of each symbol of the plurality of symbols comprises a constant modulus sequence;
the DMRS sequence of each symbol of the plurality of symbols comprises a Zadoff-Chu sequence, a Constant Amplitude Zero Auto-Correlation sequence, or both; or any combination thereof.

28. An apparatus for wireless communication at a wireless device, comprising:
a processor,
memory coupled with the processor; and
instructions stored in the memory and executable by the processor to cause the apparatus to:
generate a plurality of symbols, wherein each symbol of the plurality of symbols comprises a first portion comprising data and a second portion comprising a demodulation reference signal (DMRS) sequence, wherein the second portion of each symbol is positioned at the end of the respective symbol;
add, to a beginning of each symbol in the plurality of symbols, a cyclic prefix comprising a repetition of the DMRS sequence in the second portion of the respective symbol; and
transmit the plurality of symbols, including the cyclic prefix at the beginning of each respective symbol, in a burst over a wireless channel using a single-carrier waveform.

29. The apparatus of claim 28, wherein the instructions are further executable by the processor to cause the apparatus to:
add, for at least one symbol of the plurality of symbols, at least one additional DMRS sequence between the cyclic prefix and the second portion of the at least one symbol.

30. An apparatus for wireless communication at a wireless device, comprising:
a processor,
memory coupled with the processor; and
instructions stored in the memory and executable by the processor to cause the apparatus to:
receive, over a wireless channel via a single-carrier waveform, a burst comprising a plurality of symbols, wherein each symbol of the plurality of symbols comprises a first portion comprising data and a second portion comprising a demodulation reference signal (DMRS) sequence, wherein the second portion of each symbol is positioned at the end of the respective symbol;

identify, at a beginning of each symbol in the plurality of symbols, a cyclic prefix comprising a repetition of the DMRS sequence in the second portion of the respective symbol; and perform a channel estimation of the wireless channel based at least in part on the DMRS sequence.

* * * * *